United States Patent
Kogure et al.

(10) Patent No.: US 12,169,721 B2
(45) Date of Patent: Dec. 17, 2024

(54) INFORMATION PROCESSING SYSTEM AND APPARATUS TO GENERATE DESCRIPTION FILE CORRESPONDING TO REPRODUCTION APPLICATION BASED ON EDIT INSTRUCTION

(71) Applicant: CANON KABUSHIKI KAISHA, Tokyo (JP)

(72) Inventors: Takeshi Kogure, Ibaraki (JP); Atsushi Ikeda, Ibaraki (JP); Hiroaki Koike, Tokyo (JP); Sora Kumagai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 17/862,116

(22) Filed: Jul. 11, 2022

(65) Prior Publication Data
US 2023/0020062 A1   Jan. 19, 2023

(30) Foreign Application Priority Data
Jul. 12, 2021 (JP) .................................. 2021-114971

(51) Int. Cl.
*G06F 9/445* (2018.01)
*G06F 8/61* (2018.01)
*H04N 1/00* (2006.01)

(52) U.S. Cl.
CPC .............. *G06F 9/4451* (2013.01); *G06F 8/61* (2013.01); *H04N 1/00244* (2013.01); *H04N 1/00949* (2013.01); *H04N 2201/0094* (2013.01)

(58) Field of Classification Search
CPC .. G06F 9/4451; G06F 8/61; H04N 2201/0094
(Continued)

(56) References Cited

U.S. PATENT DOCUMENTS

| 7,818,733 B2 * | 10/2010 | Hargrave ................ H04L 41/08 717/166 |
| 8,473,573 B2 * | 6/2013 | Park ....................... H04L 67/34 725/86 |

(Continued)

FOREIGN PATENT DOCUMENTS

| JP | 2003108373 A | 4/2003 |
| JP | 2010079803 A | 4/2010 |

(Continued)

OTHER PUBLICATIONS

Van Heel, Marin, et al. "A new generation of the IMAGIC image processing system." Journal of structural biology 116.1 (1996): pp. 17-24. (Year: 1996).*

(Continued)

*Primary Examiner* — Satish Rampuria
(74) *Attorney, Agent, or Firm* — Canon U.S.A., Inc. IP Division

(57) ABSTRACT

An information processing system provides combined information in which a description file defining an operation procedure and a reproduction application configured to reproduce the description file are combined, as a combined application to be executed by an image processing apparatus. The information processing system includes one or more control circuits each having a processor and a memory containing instructions that, when executed by the processor, cause the processor to function as an acquisition unit, an output unit, a reception unit, and a generation unit. The acquisition unit is configured to acquire definition information from the reproduction application. The output unit is configured to output screen information to a display based on the definition information. The reception unit is configured to receive an edit instruction corresponding to the screen information. The generation unit is configured to (Continued)

generate the description file corresponding to the reproduction application, based on the edit instruction.

17 Claims, 22 Drawing Sheets

(58) Field of Classification Search
USPC .................................................. 717/120–178
See application file for complete search history.

(56) References Cited

U.S. PATENT DOCUMENTS

| | | | | |
|---|---|---|---|---|
| 8,504,988 B2* | 8/2013 | DeGroote | ................. | G06F 8/20 |
| | | | | 717/117 |
| 9,772,836 B2* | 9/2017 | Fauteck | ..................... | G06F 8/65 |
| 2003/0066047 A1* | 4/2003 | Watase | ....................... | G06F 8/20 |
| | | | | 717/100 |
| 2004/0254944 A1* | 12/2004 | Simpson | ................. | H04L 41/00 |
| 2006/0248507 A1* | 11/2006 | Benjes | ....................... | G06F 8/24 |
| | | | | 717/108 |
| 2011/0087710 A1* | 4/2011 | Neil | ...................... | G06F 16/258 |
| | | | | 707/E17.044 |

FOREIGN PATENT DOCUMENTS

| | | |
|---|---|---|
| JP | 2016002470 A | 1/2016 |
| JP | 2016024701 A | 2/2016 |
| JP | 2020107124 A | 7/2020 |

OTHER PUBLICATIONS

Crowther, R. A., Richard Henderson, and John M. Smith. "MRC image processing programs." Journal of structural biology 116.1 (1996): pp. 9-16. (Year: 1996).*

Moher, Thomas G. "Provide: A process visualization and debugging environment." IEEE Transactions on Software Engineering 14.6 (1988): pp. 849-857. (Year: 1988).*

Ousterhout, John K., et al. "The Sprite network operating system." Computer 21.2 (1988): pp. 23-36. (Year: 1988).*

Upson, Craig, et al. "The application visualization system: A computational environment for scientific visualization." IEEE Computer Graphics and Applications 9.4 (1989): pp. 30-42. (Year: 1989).*

Shaw, Mary, et al. "Abstractions for software architecture and tools to support them." IEEE transactions on software engineering 21.4 (1995): pp. 314-335. (Year: 1995).*

* cited by examiner

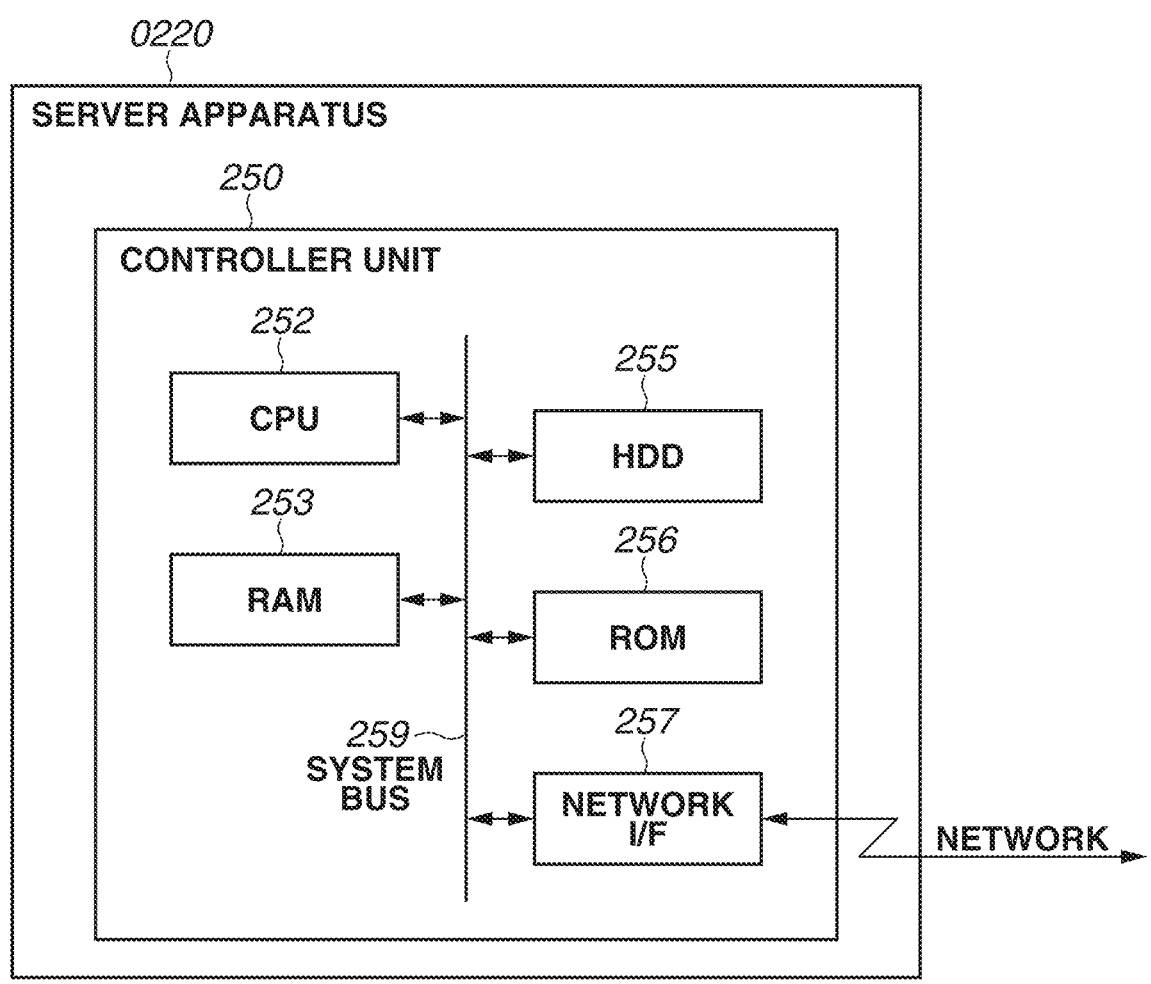

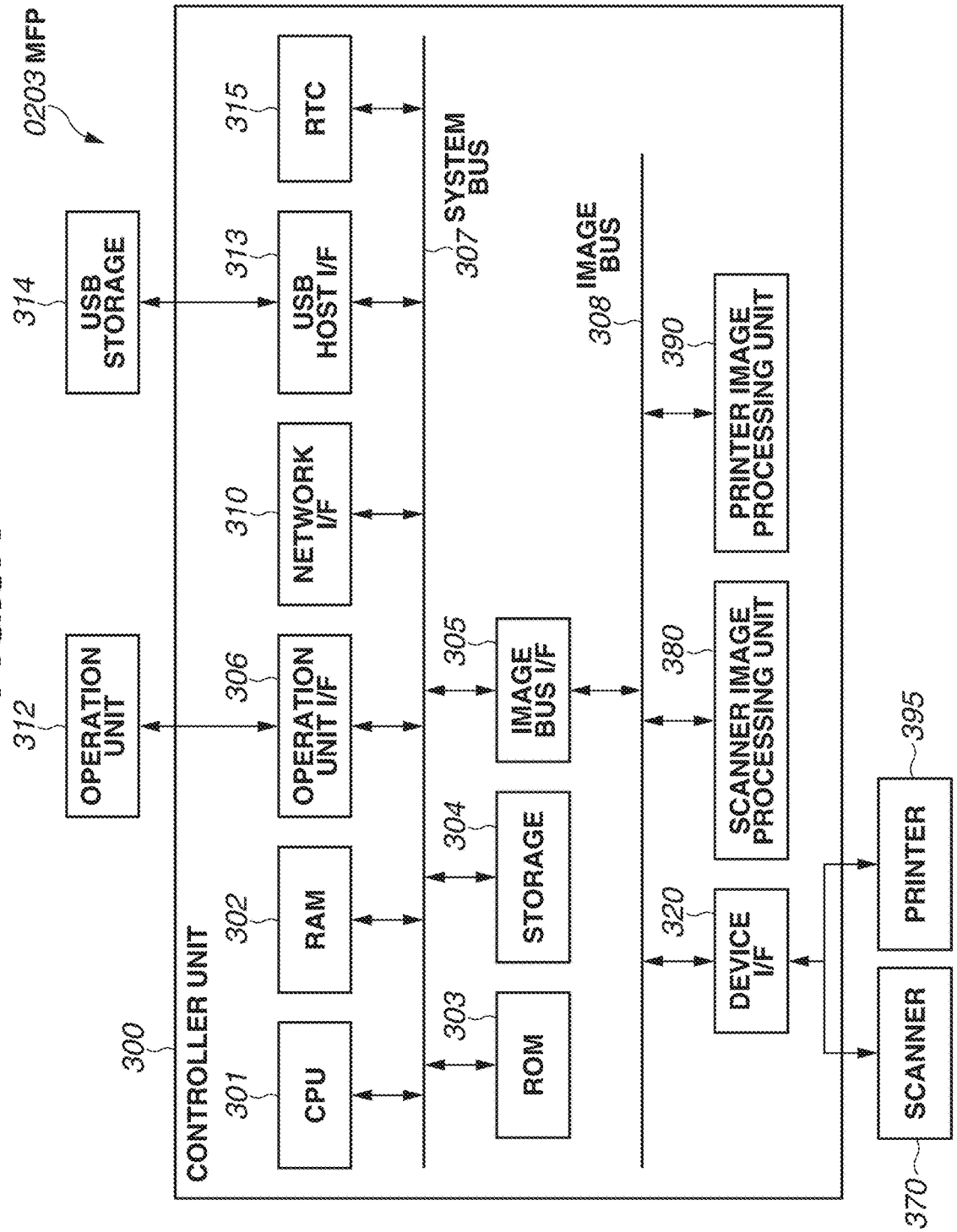

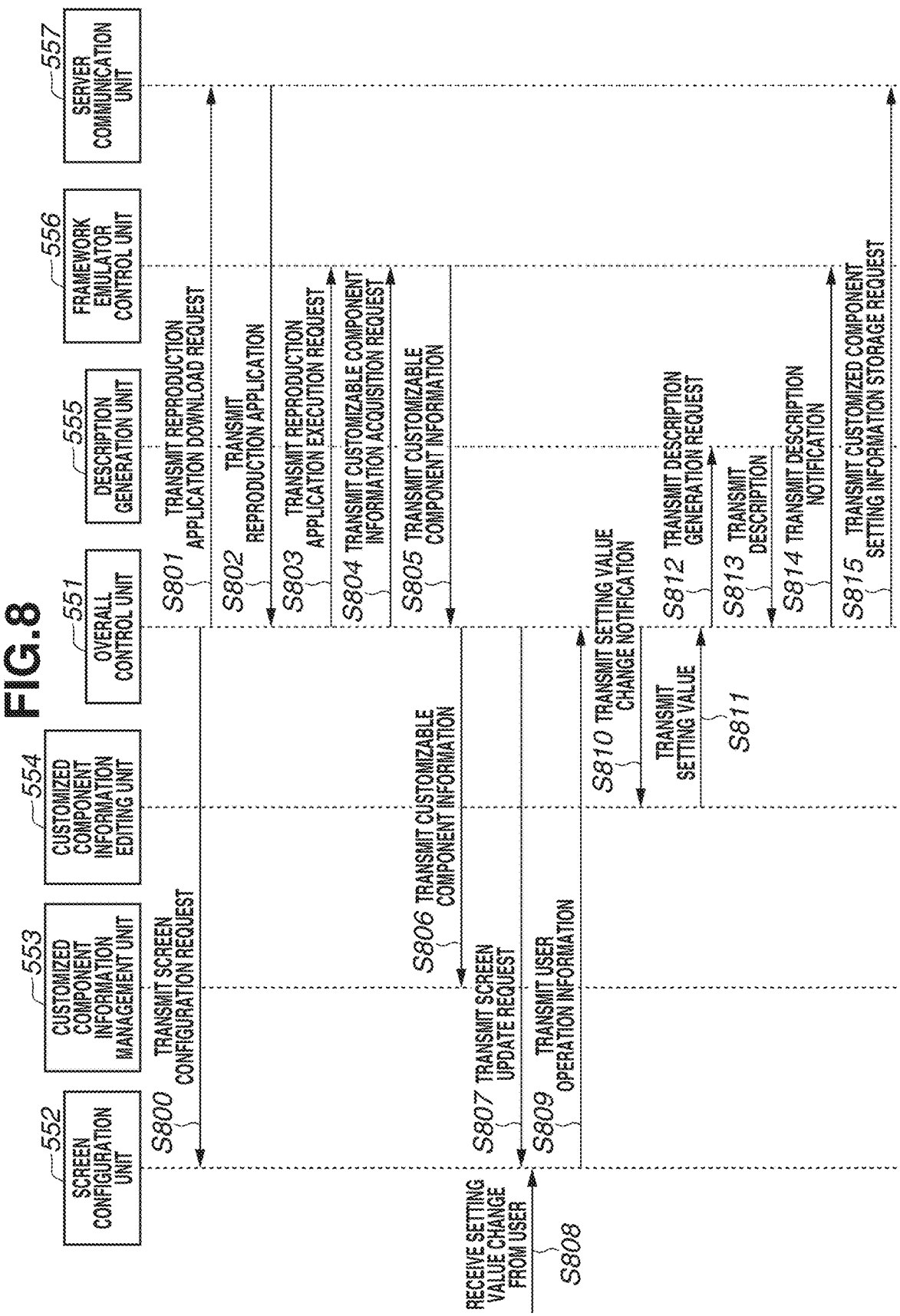

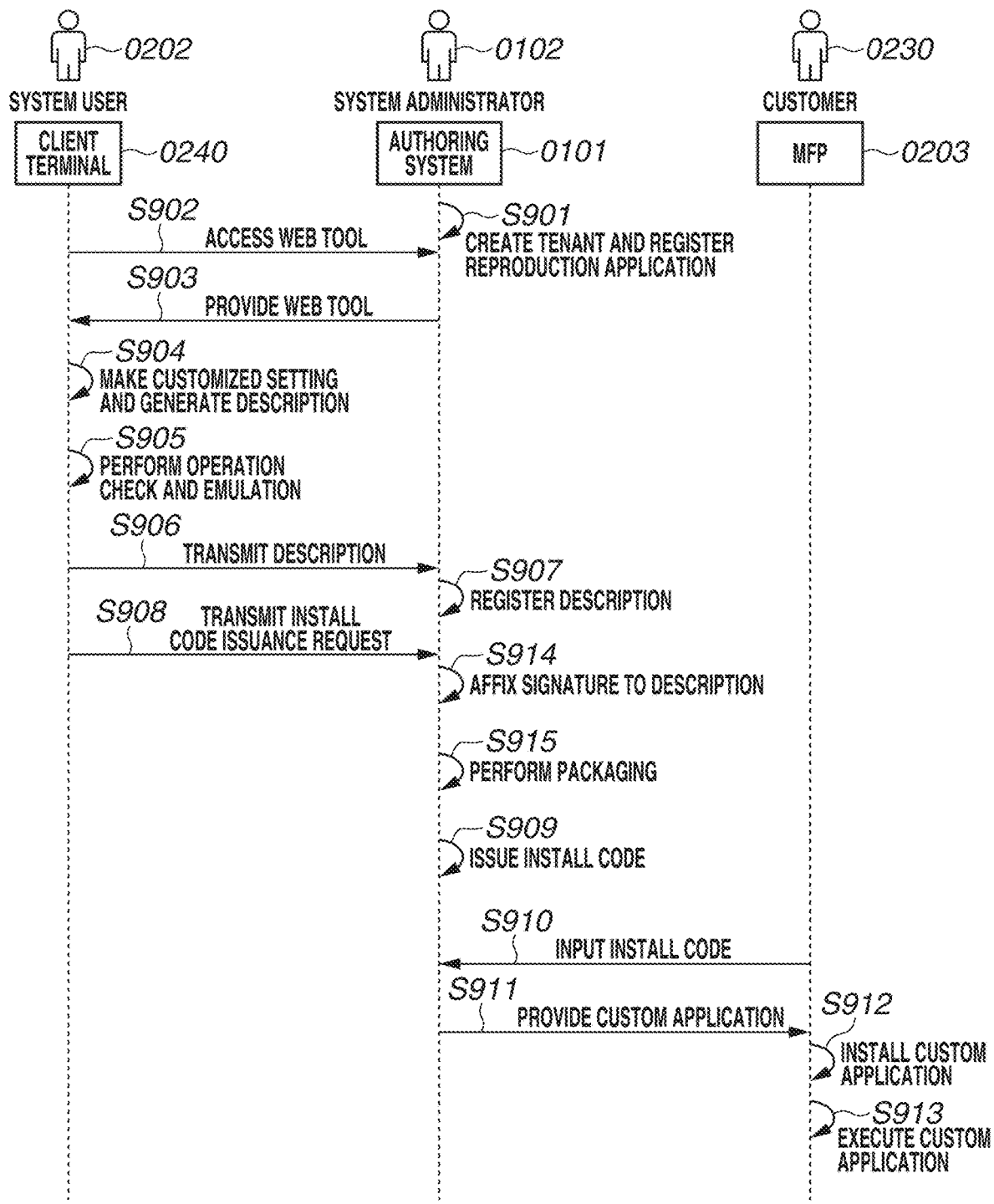

FIG.11

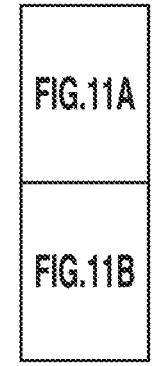

FIG.11A

```
{
  "panel": {
    "panel1": [ ~1101
      { ~1103
        "id":"title", ~1104
        "attrib": { ~1105
          "title": { ~1106
            "data_type": "string", ~1107
            "data": { ~1108
              "ja": "Custom Application", "en": "Custom Application"
            }
          }
        }
      },
      { ~1109
        "id": "message",
        "attrib": {
          "message": {
            "data_type": "string",
            "data": {
              "ja": "Execute Copy. \n *Display "OK" in easy-to-touch manner", "en": "Execute Copy."
            }
          }
        }
      },
      { ~1110
        "id": "button",
        "attrib": {
          "position": {
            "data_type": "position",
            "data": {
              "x": 0, "y": 280, "width": 200, "height": 200
            }
          },
          "name": {
            "data_type": "string",
            "data": {
              "ja": "OK", "en": "OK",
            }
          },
          "action": {
            "data_type": "change_panel",
            "data": {
              "next_panel": "panel2"
            }
          }
        }
      },
```

FIG.11B

```
    { ~1111
      "id": "button",
      "attrib": {
        "position": {
          "data_type": "position",
          "data": {
            "x": 700, "y": 480, "width": 100, "height": 30
          }
        },
        "name": {
          "data_type": "string",
          "data": {
            "ja": "Cancel", "en": "Cancel",
          }
        },
        "action": {
          "data_type": "change_panel",
          "data": {
            "next_panel": "exit"
          }
        }
      }
    }
  ],
  "panel2": [ ~1102
    {
      "id" : "execute_job", ~1112
      "attrib": {
        "job": { ~1113
          "data_type": "job",
          "data": {
            "id": "copy", ~1114
            "job_attrib": { ~1115
              "copies": { ~1116
                "data_type": "int_100",
                "data": 1
              },
              "color_mode": { ~1117
                "data_type": "select",
                "data": "color"
              }
            }
          }
        },
        "action": {
          "data_type": "change_panel",
          "data": {
            "next_panel": "exit"
          }
        }
      }
    }
  ]
}
```

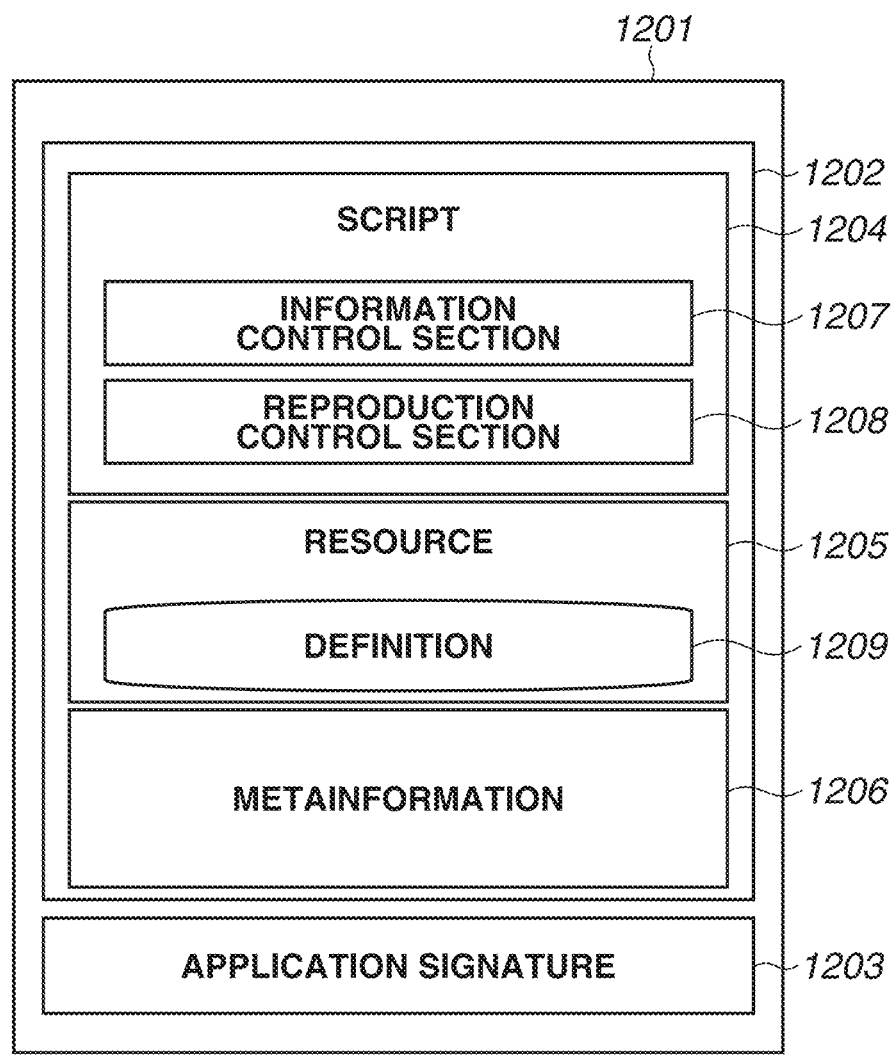

FIG.13

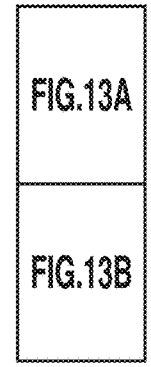

FIG.13A

```
{
  "gui" : [ ~1301
    { ~1303
      "id": "title", ~1305
      "localize": { ~1306
        "ja": "title",
        "en": "title"
      },
      "attrib": [ ~1307
        {
          "id": "title", ~1308
          "localize": { ~1309
            "ja": "string",
            "en": "string"
          },
          "data_type": [ "string" ] ~1310
        }
      ]
    },
    { ~1304
      "id": "button",
      "localize": {
        "ja": "button",
        "en": "button"
      },
      "attrib": [
        {
          "id": "position",
          "localize": {
            "ja": "position",
            "en": "position"
          },
          "data_type": [ "position" ] ~1311
        },
        {
          "id": "name",
          "localize": {
            "ja": "button name",
            "en": "button name"
          },
          "data_type": [ "string" ]
        },
```

FIG.13B

```
        {
            "id": "action",
            "localize": {
                "ja": "action",
                "en": "action"
            },
            "data_type": [ "change_panel" ]  ~1312
        }
        ]
    },
    :::: omitted
    ::::
    ],
    "job": [  ~1302
    {
        "id": "copy",  ~1313
        "localize": {
            "ja":"Copy",
            "en":"Copy"
        },
        "attrib": [  ~1314
        {
            "id": "copies",
            "localize": {
                "ja": "copies",
                "en": "copies"
            },
            "data_type": [ "int_100" ]  ~1315
        },
        {
            "id": "color_mode",
            "localize": {
                "ja": "color mode",
                "en": "color mode"
            },
            "data_type": [ "select" ],  ~1316
            "data_range": [  ~1317
            {
                "id": "color",  ~1318
                "localize": { "ja": "color", "en": "color" }  ~1319
            },
            {
                "id": "bw",
                "localize": { "ja": "black & white", "en": "black & white" }
            }
            ]
        }
        ]
    },
    :::: omitted
    ::::
    ]
}
```

FRAMEWORK EMULATOR CONTROL UNIT

1407
VM EMULATOR UNIT

1401
VM SYSTEM SERVICE EMULATOR UNIT

- 1402 DRAWING API EMULATOR UNIT
- 1403 JOB CONTROL API EMULATOR UNIT
- 1404 DESCRIPTION CONTROL UNIT
- 1405 USER OPERATION CONTROL UNIT
- 1406 CUSTOMIZABLE COMPONENT INFORMATION CONTROL UNIT

FIG.17

```
{
  "gui" : [
    :::: omitted
    ::::
  ],
  "job": [
    {
      "id": "scan_to_usb",
      "localize": {
        "ja":"Scan To USB",
        "en":"Scan To USB"
      },
      "attrib": [
        {
          "id": "color_mode",
          "localize": {
            "ja": "color mode",
            "en": "color mode"
          },
          "data_type": [ "select" ],
          "data_range": [
            {
              "id": "color",
              "localize": { "ja": "color", "en": "color" },
            },
            {
              "id": "bw",
              "localize": { "ja": "black & white", "en": "black & white" },
            }
          ]
        },
        {
          "id": "paper_size",
          "localize": {
            "ja": "paper size",
            "en": "paper size"
          },
          "data_type": [ "select" ],
          "data_range": [
            {  ~1701
              "id": "a3",
              "localize": { "ja": "A3", "en": "A3" },
              "depend": true  ~1703
            },
            {  ~1702
              "id": "a4",
              "localize": { "ja": "A4", "en": "A4" },
              "depend": false  ~1704
            }
          ]
        },
      ]
    },
    :::: omitted
    ::::
  ]
}
```

INFORMATION PROCESSING SYSTEM AND APPARATUS TO GENERATE DESCRIPTION FILE CORRESPONDING TO REPRODUCTION APPLICATION BASED ON EDIT INSTRUCTION

BACKGROUND

Technical Field

One disclosed aspect of the embodiments relates to a system that edits an application to be installed onto an information processing apparatus. In particular, the disclosure is related to an authoring system.

Description of the Related Art

There is known a mechanism that extends a function by installing an application onto an information processing apparatus such as an MFP. Japanese Patent Application Laid-Open No. 2016-24701 discusses a technique for managing applications installed on an information processing apparatus, using application identifiers (IDs).

Different customers using information processing apparatuses have different needs. Applications such as those discussed in Japanese Patent Application Laid-Open No. 2016-24701 are sometimes tailored and provided to specific customers in actual situation. It is desirable for persons concerned, such as servicemen and sales representatives, to customize applications and provide the customized applications to the customers in order to promptly respond to the needs of the customers.

In the mechanism using a plurality of pieces of data in combination, an incompatibility between the pieces of data, such as a version mismatch can cause an error.

SUMMARY

One aspect of the embodiments is directed to a system capable of appropriately managing a custom application that is based on a description file and application data.

According to an aspect of the disclosure, an information processing system is configured to provide combined information in which a description file defining an operation procedure and a reproduction application configured to reproduce the description file are combined, as a combined application to be executed by an image processing apparatus. The information processing system includes one or more control circuits each having a processor and a memory containing instructions that, when executed by the processor, cause the processor to function as an acquisition unit, an output unit, a reception unit, and a generation unit. The acquisition unit is configured to acquire definition information from the reproduction application. The output unit is configured to output screen information to a display based on the definition information. The reception unit is configured to receive an edit instruction corresponding to the screen information. The generation unit is configured to generate the description file corresponding to the reproduction application, based on the edit instruction.

According to another aspect of the disclosure, an information processing apparatus is configured to edit combined information in which a description file defining an operation procedure and a reproduction application configured to reproduce the description file are combined, as a combined application to be executed by an image processing apparatus. The information processing apparatus includes one or more control circuits each having a processor and a memory containing instructions that, when executed by the processor, cause the processor to function as an acquisition unit, an output unit, a reception unit, and a generation unit. The acquisition unit is configured to acquire definition information from the reproduction application. The output unit is configured to output screen information to a display based on the definition information. The reception unit is configured to receive an edit instruction corresponding to the screen information. The generation unit is configured to generate the description file corresponding to the reproduction application, based on the edit instruction.

Further features of the disclosure will become apparent from the following description of exemplary embodiments with reference to the attached drawings.

BRIEF DESCRIPTION OF THE DRAWINGS

FIG. 2B is a diagram illustrating a hardware configuration of a server apparatus used in the authoring system.

FIG. 3A is a diagram illustrating a hardware configuration of a multifunction peripheral (MFP).

FIG. 8 is a sequence diagram illustrating processing to be performed between software modules of the description editor.

FIG. 9 is a diagram illustrating a usage flow of the authoring system.

FIG. 11 shows the overall diagram for a description. FIGS. 11A and 11B are a diagram illustrating a description.

FIG. 12 is a diagram illustrating a structure of a reproduction application.

FIG. 13 shows the overall diagram for customizable component information.

FIGS. 13A and 13B are a diagram illustrating customizable component information.

FIG. 14 is a diagram illustrating a software module configuration of a framework emulator control unit of the description editor.

FIG. 17 is a diagram illustrating customizable component information including model-dependent information.

DESCRIPTION OF THE EMBODIMENTS

Figure 1:
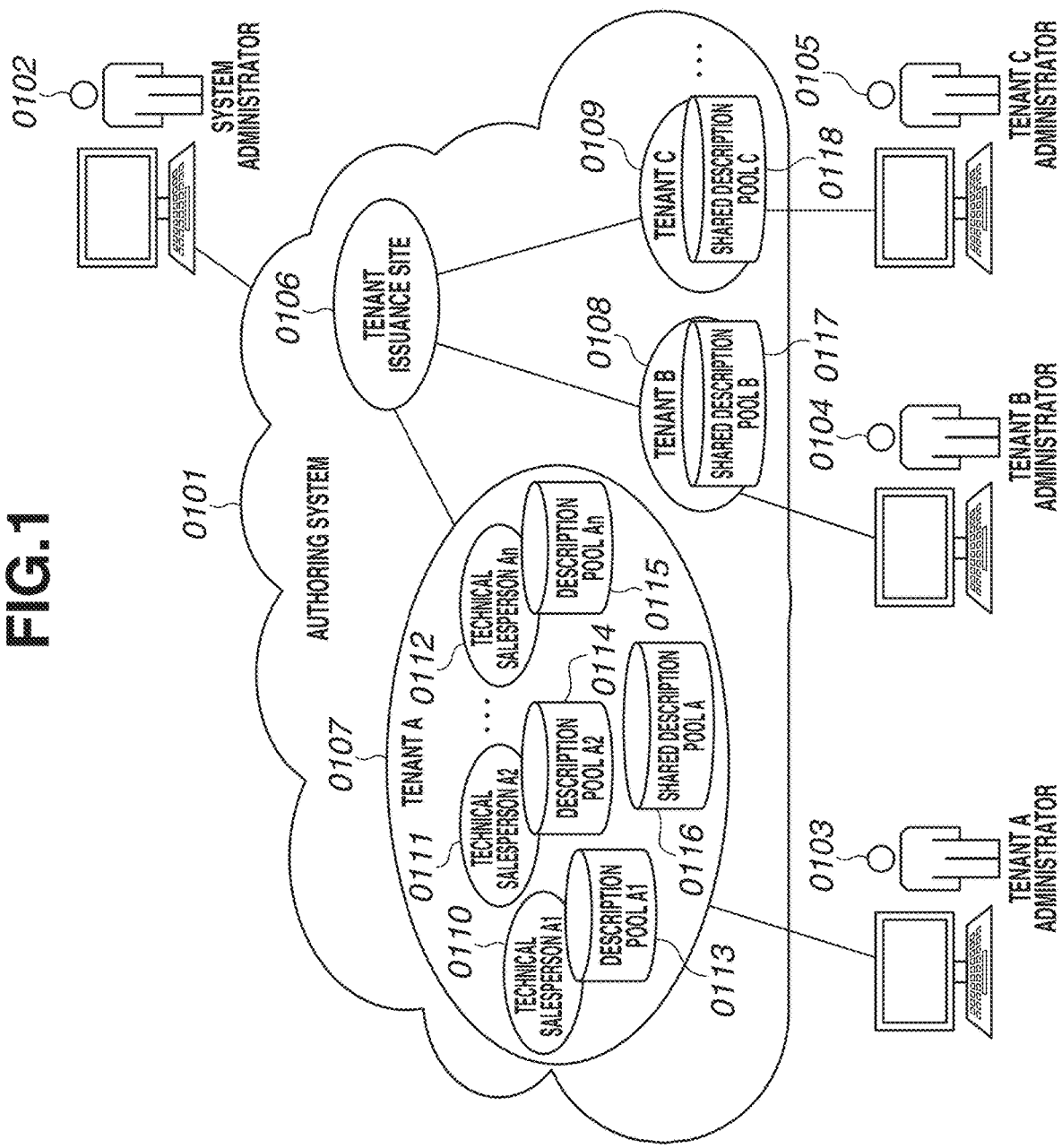
FIG. 1 is a diagram illustrating an authoring system.

An exemplary embodiment will be concretely described below using examples with reference to the drawings. The scope of the disclosure is not limited to configurations described in the exemplary embodiment. Within the scope in which a similar effect is obtainable, modifications may be made by omitting or replacing a part of the configurations or a part of processing with an equivalent. A system or apparatus may be implemented in a number of ways depending on the context and application. For example, as an information processing apparatus, an image forming apparatus such as a printer, a scanner, a facsimile, a copier, or a multifunction peripheral (MFP) having functions of these apparatuses can be used. Alternatively, as an information processing apparatus, an electronic device such as a personal computer or a mobile terminal can be used. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above Authoring System FIG. 1 illustrates an authoring system 0101 according to an exemplary embodiment. The authoring system 0101 is an information processing system that provides an editing environment of a custom application to be executed on a multifunction peripheral (MFP) 0203 (see FIG. 2A). In the present exemplary embodiment, using the authoring system 0101 enables persons concerned, such as servicemen and sales representatives, to customize applications. This makes it possible to promptly provide the custom applications satisfying the needs of customers. This also makes it possible to appropriately manage increasing types of custom applications with increasing needs of customers.

The authoring system 0101 is constructed on a general-purpose cloud service, and is accessible from various apparatuses via a network. The login of all administrators and users who use the authoring system 0101 is managed by a user authentication mechanism. More specifically, each of the administrators and the users performs a user authentication procedure using a user ID and a password at the time of starting to use the authoring system 0101. In the present exemplary embodiment, a function provided by a general-purpose cloud service is used as the user authentication mechanism, and the detailed description thereof will be omitted. Alternatively, the authoring system 0101 may include a unique user authentication function.

The authoring system 0101 includes a tenant issuance site 0106, and can create a plurality of tenants depending on the intended use. FIG. 1 illustrates a state in which at least a tenant A (0107), a tenant B (0108), and a tenant C (0109) have been issued. For example, by accessing the tenant issuance site 0106 via a web browser from a client terminal, a system administrator 0102 can create tenants for group sales companies in various companies. Alternatively, the system administrator 0102 may issue tenants to system integrators, not to the group sales companies.

In a case where tenants are issued, one or more administrators are assigned to each of the tenants to manage the tenant. FIG. 1 illustrates an example in which at least a tenant A administrator 0103 who manages the tenant A (0107), a tenant B administrator 0104 who manages the tenant B (0108), and a tenant C administrator 0105 who manages the tenant C (0109) exist. A tenant administrator of a certain tenant can set or delete another tenant administrator.

Each tenant administrator can access the tenant to be managed, via a web browser from a client terminal, to create a plurality of accounts of users who use the tenant. FIG. 1 illustrates an example in which the tenant A administrator 0103 has created the accounts of technical salespersons ranging from a technical salesperson A1 (0110) and a technical salesperson A2 (0111) to a technical salesperson An (0112) (n is a natural number). A description pool for storing a description is allocated to each of the accounts. In this example, the description is a file (a description file) describing the behavior (the operation procedure) of a custom application, and can be created using the authoring system 0101. A configuration of the custom application and details of the description file will be described below.

FIG. 1 illustrates a state in which the description pools are allocated to the respective accounts of the technical salespersons ranging from the technical salesperson A1 (0110) and the technical salesperson A2 (0111) to the technical salesperson An (0112). More specifically, the description pools ranging from a description pool A1 (0113) and a description pool A2 (0114) to a description pool An (0115) (n is a natural number) are allocated to the respective accounts. Although not illustrated in FIG. 1, the tenant B administrator 0104 and the tenant C administrator 0105 can appropriately create the accounts of users in the respective tenants, similarly to the tenant A administrator 0103. In addition, each tenant administrator can permit the sharing of one description among the plurality of accounts in the tenant by arranging a shared description pool in the tenant. FIG. 1 illustrates an example in which a shared description pool A (0116) is arranged in the tenant A (0107) to share one description in the tenant A (0107). As a similar configuration for sharing one description in a tenant, a shared description pool B (0117) and a shared description pool C (0118) are arranged in the tenant B (0108) and the tenant C (0109), respectively.

In the present exemplary embodiment, it is assumed that a shared description pool is set so that all accounts in the tenant can read and write the description. The setting of the shared description pool may be changed so that the writing or reading is restricted depending on the account. Alternatively, the authoring system 0101 may include a shared description pool accessible from accounts in all tenants. Also in this case, the shared description pool may be set so that restrictions are imposed depending on the account.

Usage Flow of System

A main usage flow of the authoring system 0101 will be described with reference to FIG. 9. FIG. 9 illustrates the usage flow of the authoring system 0101.

In step S901, the system administrator 0102 performs tenant creation processing and reproduction application registration processing on the authoring system 0101. In the authoring system 0101, not only information about a reproduction application for a custom application but also information about a normal application are registered. These applications are managed so as to be distinguishable from other applications based on uniquely identifiable information. In step S902, a system user 0202 accesses a web tool based on tenant information, using a client terminal 0240. In step S903, the client terminal 0240 acquires the web tool from the authoring system 0101 via a network.

In steps S904 to S907, in response to an instruction from the system user 0202, the client terminal 0240 performs description generation processing and description registration processing using the web tool. Step S904 makes customized setting and generates the description. Step S905 performs operation check and emulation. Step S906 transmits the description. In step S907, upon receiving the description, the authoring system 0101 registers the description. A description 0219 (see FIG. 2A) registered in the authoring system 0101 is managed so as to be distinguishable from other descriptions, based on uniquely identifiable information. The description generation processing and the description registration processing will be described in detail below with reference to FIG. 15.

In step S908, the client terminal 0240 transmits an install code issuance request to the authoring system 0101, for a custom application that is to use the registered description 0219.

In step S914, the authoring system 0101 that has received the install code issuance request affixes signature information to the description 0219 by using signing key information 0218 (see FIG. 2A) in description signature affixation 0211 to be described below (see FIG. 2A). The signing key information 0218 is different from key information to be used for affixing a signature to a reproduction application to be described below. The key information to be used for affixing a signature to a reproduction application is managed in a development environment of a system developer 0201 (see FIG. 2A).

In step S915, the authoring system 0101 performs packaging processing on the signed description and a signed reproduction application in custom application packaging 0212 to be described below (see FIG. 2A).

Figure 2A:
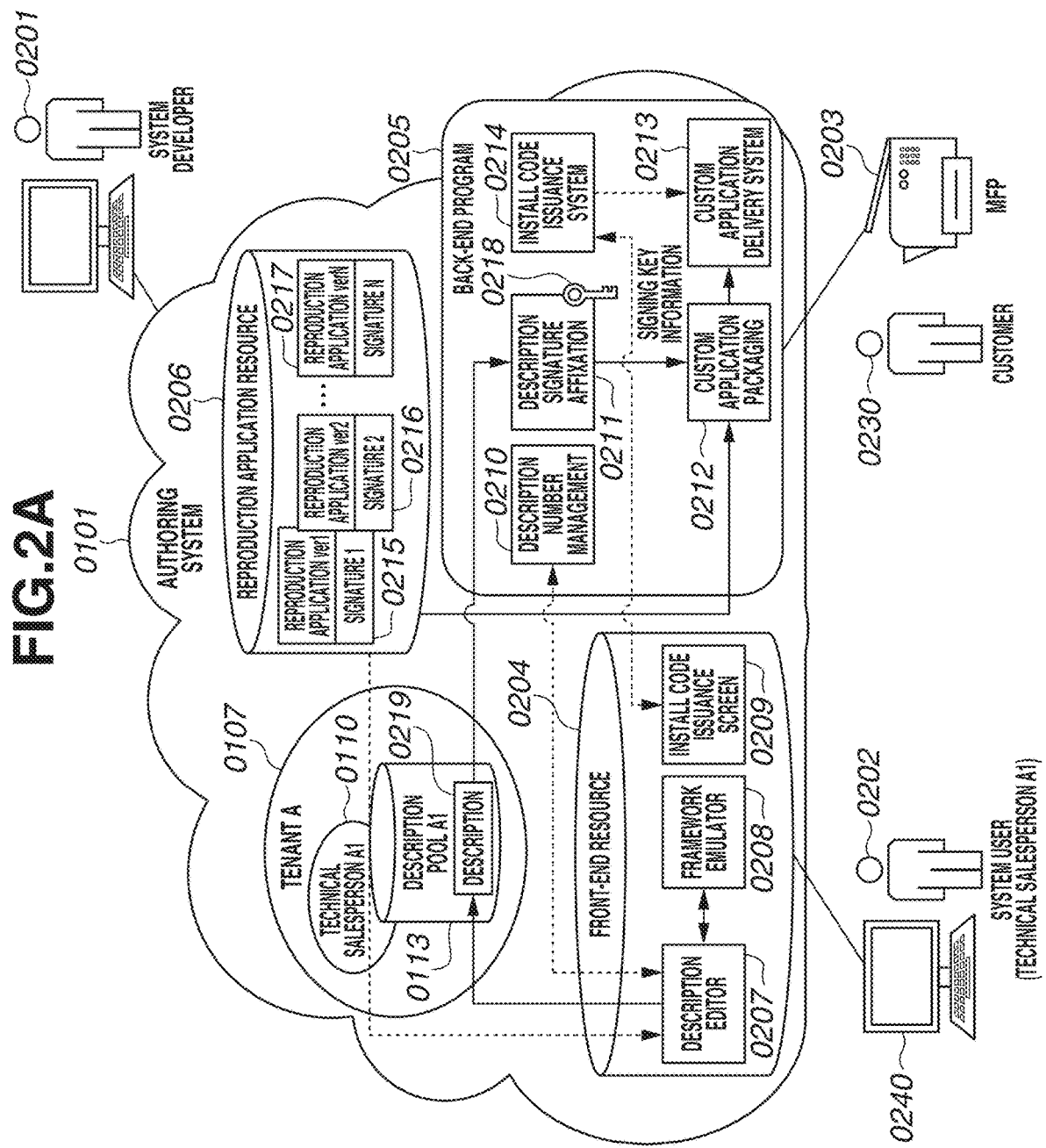
FIG. 2A is a diagram illustrating a software configuration of the authoring system.

In step S909, the authoring system 0101 issues an install code in an install code issuance system 0214 (see FIG. 2A), and registers the packaged custom application into a custom application delivery system 0213 (see FIG. 2A). The issued install code is transmitted from the system user 0202 to a customer 0230 by a communication tool such as a telephone or an e-mail.

In step S910, when the customer 0230 inputs the install code to the MFP 0203, the MFP 0203 transmits the install code to the authoring system 0101.

In step S911, the authoring system 0101 provides, to the MFP 0203, the custom application corresponding to the received install code via the custom application delivery system 0213.

In step S912, the MFP 0203 that has received the custom application installs the received custom application. When the installation is successfully completed, then in step S913, the application is executed, so that the customer 0230 can use a function provided by the application.

Software Configuration of Authoring System

Next, a software configuration of the authoring system 0101 will be described. FIG. 2A illustrates a software configuration of the authoring system 0101.

In FIG. 2A, the authoring system 0101, the tenant A (0107), the technical salesperson A1 (0110) as a user account, and the description pool A1 (0113) are the same as those illustrated in FIG. 1.

The authoring system 0101 includes software modules such as a front-end resource 0204, a back-end program 0205, and a reproduction application resource 0206.

The front-end resource 0204 stores resources such as a description editor 0207, a framework emulator 0208, and an install code issuance screen 0209. Each of the resources operates on a web browser to be used when a user accesses the authoring system 0101, using a program written in a language such as JavaScript.

The description editor 0207 is a program (an editing program) operating on a web browser when a user of each tenant creates and edits a description. The description created using the description editor 0207 can be stored into the description pool associated with the account of the user. FIG. 2A illustrates an example in which the system user 0202 (the technical salesperson A1) logs into the authoring system 0101 and accesses the front-end resource 0204. FIG. 2A also illustrates a state in which the description 0219 created by the system user 0202 (the technical salesperson A1) using the description editor 0207 included in the front-end resource 0204 is stored in the description pool A1 (0113). As described above, the description pool A1 (0113) is associated with the technical salesperson A1 (0110) that is a user account created in the tenant A (0107).

The framework emulator 0208 is a program to be invoked for checking, in the description editor 0207, the behavior of a description that is being created (edited) or has been created on the description editor 0207. The framework emulator 0208 is configured to operate on a web browser. The framework emulator 0208 emulates the operation of an application framework in a device, and visualizes the behavior of a custom application including the created description, by outputting the behavior as screen information.

The install code issuance screen 0209 is a program for displaying an install code to be used to install the custom application onto the device, on a web browser used by the user.

The back-end program 0205 stores programs such as description number management 0210, the description signature affixation 0211, the custom application packaging 0212, the custom application delivery system 0213, and the install code issuance system 0214.

Each of the programs stored in the back-end program 0205 is executed by a server apparatus 0220 (see FIG. 2B) on a cloud hosting the authoring system 0101, and operates in cooperation with the programs of the front-end resource 0204.

The description number management 0210 is a program for issuing a unique serial number for identifying each individual description. The description number management 0210 is invoked when the user starts to create a new description using the description editor 0207. The description number management 0210 is also invoked when the user deletes a description created in the past. If the description to be deleted is not used as a custom application, the description number management 0210 performs processing such as returning the serial number allocated when the description is created, to a reusable state.

The description signature affixation 0211 is a program for affixing a signature to a description to guarantee that the description is not falsified. For example, the signature is affixed at the time of generating an install package of a custom application including the created description. The description signature affixation 0211 includes the signing key information 0218 to be used when the signature is affixed. FIG. 2A illustrates an example in which the description signature affixation 0211 affixes a signature to the description 0219 stored in the description pool A1 (0113).

The custom application packaging 0212 is a program for creating an install package of a custom application. In the install package, the signed description generated by the description signature affixation 0211 and a specific reproduction application to be described below are combined into one package. Creating the install package enables the custom application to be installed onto a desired device. A package data structure of the install package will be described in detail below.

The custom application delivery system 0213 is a system program that delivers, to a device, an install package of one or more custom applications associated in advance with an install code issued on the install code issuance screen 0209. An install package of one or more custom applications will be hereinafter also referred to as an install package archive of one or more custom applications. When the custom application delivery system 0213 receives, from a device, a delivery request with an install code, the custom application delivery system 0213 transmits, to the device, the install package archive of the custom application(s) associated with the install code. FIG. 2A illustrates an example in which the MFP 0203 serving as the device is connected to the back-end program 0205 of the authoring system 0101, and the install packages of the custom applications are sequentially transmitted to the MFP 0203.

The install code issuance system 0214 is a program that operates in cooperation with the install code issuance screen 0209, and issues the install code corresponding to one or more custom applications selected by the user. The install code issuance system 0214 internally holds a table indicating a relationship between the selected one or more custom applications (i.e., the install package archive of the custom application(s)) and the issued install code. The details thereof will be described below.

The install package archive of one or more custom applications may be generated on demand, or may be generated in advance.

In a case where the install package archive is to be generated on demand, after the custom application delivery system 0213 receives, from a device, a delivery request with an install code, the custom application packaging 0212 generates the install package archive. On the other hand, in a case where the install package archive is to be generated in advance, when the install code issuance system 0214 issues an install code, the custom application packaging 0212 generates the install package archive. The generated install package archive is held in the install code issuance system 0214 together with the table indicating the relationship with the issued install code.

The reproduction application resource 0206 stores a signed application that is a reproduction application for reproducing the created description and is also a package to which a signature is affixed in advance. A reproduction application is an application that reproduces, play, or views a variety of custom application UIs based on a created description. The number of reproduction applications managed by the reproduction application resource 0206 is not limited to one. For example, a plurality of reproduction applications may be managed separately on a version-by-version basis. FIG. 2A illustrates an example in which the reproduction application resource 0206 stores reproduction applications ranging from a reproduction application ver1 (0215) and a reproduction application ver2 (0216) to a reproduction application verN (0217) (N is a natural number), each of which has a signature affixed in advance. The corresponding signatures ranging from a "signature 1" and a "signature 2" to a "signature N" (N is a natural number) are affixed to the respective reproduction applications. Each of these signatures is signature data called an electronic signature (particularly a digital signature), and different signature data is affixed for each application data. As signature data, the encrypted hash value of the corresponding application data, which is encrypted with an encryption key, is used. The signature data is provided with the application data body as one set in order to guarantee that the application data is provided by an authorized vendor and is not falsified. Each of the reproduction applications is developed by the system developer 0201. The signatures are affixed to the reproduction applications in advance in the development environment of the system developer 0201 where the key information to be used for affixing the signatures is strictly managed. Then, the reproduction applications each having a signature affixed in advance are uploaded to the reproduction application resource 0206 by the system developer 0201 in a timely manner In addition, each of the reproduction applications stored in the reproduction application resource 0206 includes customizable component information. When starting to create a description using the description editor 0207, the user selects a version from those of the reproduction applications. Then, the description editor 0207 acquires, from the reproduction application of the selected version, the customizable component information unique to the reproduction application. This eliminates the need for the description editor 0207 to statically hold information such as menu items for use in customization.

Server Apparatus

A hardware configuration for implementing the software configuration of the authoring system 0101, which has been described with reference to FIG. 2A, will be described. Because the authoring system 0101 is constructed on the cloud, the authoring system 0101 is configured to distribute loads to a plurality of apparatuses. In the present exemplary embodiment, a case where the authoring system 0101 performs processing using one server apparatus 0220 will be described for ease of description. FIG. 2B illustrates the hardware configuration of the server apparatus 0220 used in the authoring system 0101.

The server apparatus 0220 is an information processing apparatus for implementing the authoring system 0101, and includes a controller unit or control circuit 250. The controller unit 250 includes a central processing unit (CPU) 252, a random access memory (RAM) 253, a hard disk drive (HDD) 255, a read-only memory (ROM) 256, and a network interface (I/F) 257. The CPU 252, the RAM 253, the HDD 255, the ROM 256, and the network I/F 257 are connected to one another via a system bus 259.

The CPU 252 controls the operation of the server apparatus 0220, and operates based on a program loaded into the RAM 253. In essence, the RAM 253 stores the program which includes instructions that, when executed by the CPU 252, cause the CPU 252 to perform operations described in the following. As mentioned above, these operations may correspond to functions, units, or modules. The ROM 256 is a boot ROM, and stores a system boot program. The network I/F 257 is connected to a local area network (LAN), and controls input and output of various types of information via the network. The HDD 255 stores various programs including system software. A program stored in the HDD 255 is loaded into the RAM 253, so that the CPU 252 controls the operation of the server apparatus 0220 based on the program.

Account information about the above-described administrators and users, and information about each tenant represented by the tenant A (0107) illustrated in FIG. 2A are stored and managed on the HDD 255. The front-end resource 0204, the back-end program 0205, and the reproduction application resource 0206 that are illustrated in FIG. 2A are also stored on the HDD 255. Although not illustrated in FIG. 2B, a program for implementing the user authentication mechanism for the administrators and the users, which has been described with reference to FIG. 1, is also stored on the HDD 255. When the server apparatus 0220 is activated, the program for implementing the user authentication mechanism is automatically loaded into the RAM 253 and executed by the CPU 252. For example, when the system developer 0201 or the system user 0202 (the technical salesperson A1) illustrated in FIG. 2A accesses the authoring system 0101 and attempts to log into the authoring system 0101, a request for the login is transmitted to the user authentication program via the network I/F 257. Then, the user authentication program displays a login screen on a web browser of a personal computer (PC) used by the system developer 0201 or the system user 0202 (the technical salesperson A1). The description editor 0207 and other programs stored in the front-end resource 0204 are also stored on the HDD 255. For example, when the system user 0202 (the technical salesperson A1) logs into the authoring system 0101 and accesses a uniform resource locator (URL) of the description editor 0207, a request for the access is transmitted to the server apparatus 0220 via the network I/F 257. Then, the description editor 0207, which is a program, is returned to the web browser of the PC used by the system user 0202 (the technical salesperson A1) to operate on the web browser. Similar processing is performed for the framework emulator 0208 and the install code issuance screen 0209.

The description number management 0210 and other programs stored in the back-end program 0205 are also stored on the HDD 255. As described above, the back-end program 0205 is driven in cooperation with the programs of the front-end resource 0204. In response to a driving request, each module, such as the description number management 0210, stored in the back-end program 0205 is loaded from the HDD 255 into the RAM 253 and executed by the CPU 252.

MFP

Figure 3B:
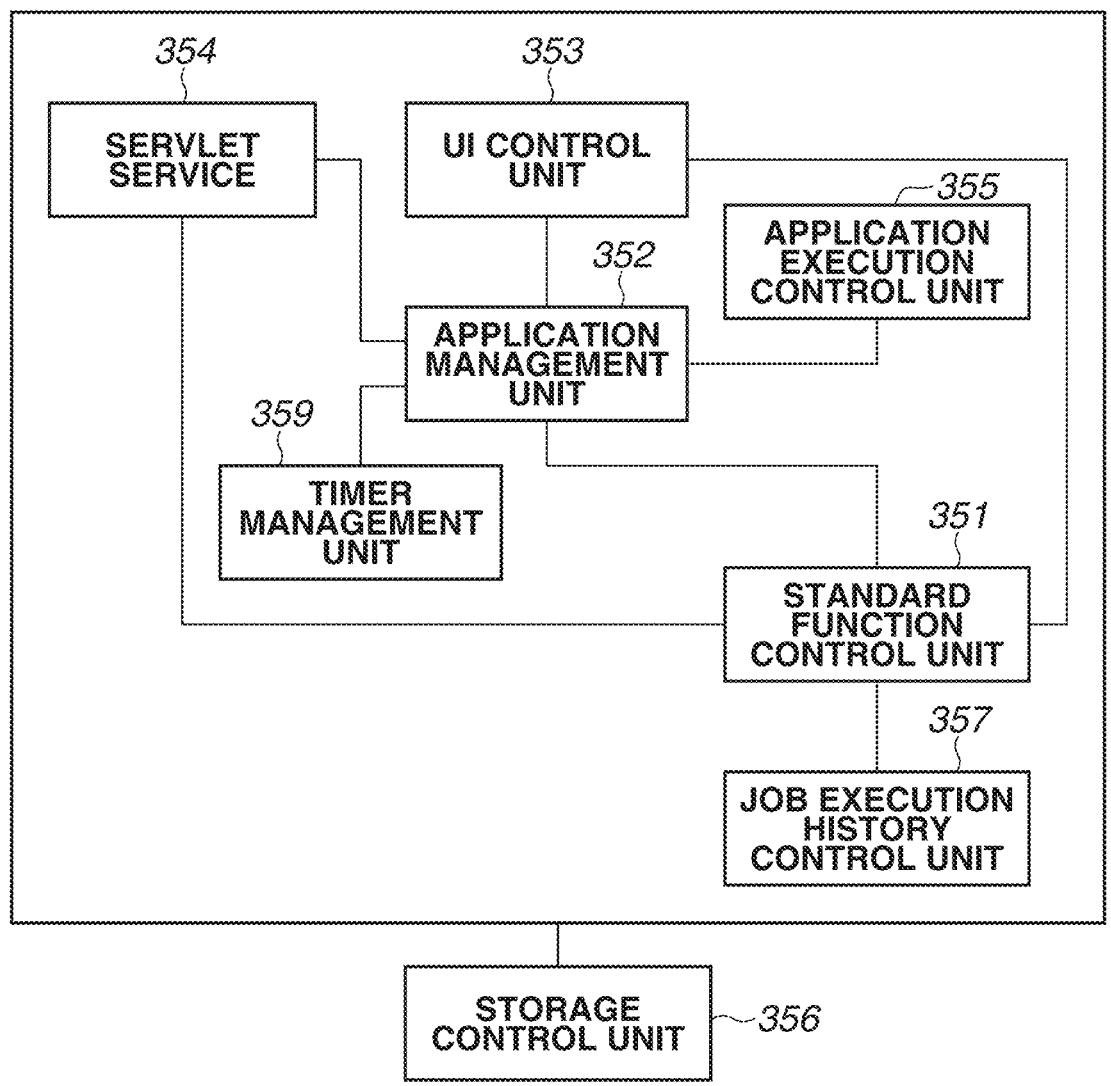
FIG. 3B is a diagram illustrating a software configuration of the MFP.

The MFP 0203 is an information processing apparatus that processes information, is an image processing apparatus that processes images, and is an image forming apparatus that forms images onto sheets. FIG. 3A illustrates a hardware configuration of the MFP 0203. FIG. 3B illustrates a software configuration of the MFP 0203.

The MFP 0203 includes a controller unit or control circuit 300, a printer 395, a scanner 370, an operation unit 312, and a universal serial bus (USB) storage 314. The controller unit 300 performs control to implement a copy function of printing and outputting image data, which is generated by the scanner 370 reading a document image, using the printer 395. The scanner 370 is an image reading unit, circuit, or device that reads an image from a document. The printer 395 is an image forming unit, circuit, or device that forms an image onto a sheet (paper). The operation unit 312 is a reception unit that receives an instruction from the user, and is also a display unit that displays information to the user.

The controller unit 300 includes a CPU 301. The CPU 301 starts up an operating system (OS) 401 (see FIG. 4) by using a boot program stored in a ROM 303.

On the OS 401, the CPU 301 executes programs stored in a storage 304, thereby executing various types of processing. The execution of the CPU 301 is similar to the CPU 252 described above. A RAM 302 is used as a work area of the CPU 301. The RAM 302 provides the work area, and also provides an image memory region for temporarily storing image data. The storage 304 stores the programs and image data.

The CPU 301 is communicably connected to components via a system bus 307.

The components include the ROM 303, the RAM 302, an operation unit I/F 306, a network I/F 310, a USB host I/F 313, and an image bus I/F 305. The operation unit I/F 306 is an interface with the operation unit 312 including a touch panel, and outputs the image data to be displayed on the operation unit 312, to the operation unit 312. The operation unit I/F 306 also transmits, to the CPU 301, information input by the user via the operation unit 312. The network I/F 310 is an interface for connecting the MFP 0203 to the LAN. The USB host I/F 313 is an interface unit for communicating with the USB storage 314. The USB host I/F 313 is also an output unit for storing the data stored in the storage 304, into the USB storage 314. The USB host I/F 313 also inputs the data from the USB storage 314, and transmits the data to the CPU 301. The USB storage 314 is an external storage device for storing data, and is detachably attached to the USB host I/F 313. A plurality of USB devices including the USB storage 314 is connectable to the USB host I/F 313. A real-time clock (RTC) 315 controls the current time. Time information controlled by the RTC 315 is used, for example, to record a job submission time. The image bus I/F 305 is a bus bridge for connecting the system bus 307 and an image bus 308 that transfers image data at high speed, and converting a format of the data. The image bus 308 includes a peripheral component interconnect (PCI) bus or a bus complying with the Institute of Electrical and Electronics Engineers (IEEE) 1394. A device I/F 320, a scanner image processing unit 380, and a printer image processing unit 390 are provided on the image bus 308. The scanner 370 and the printer 395 are connected to the device I/F 320, and the device I/F 320 performs synchronous/asynchronous conversion of image data. The scanner image processing unit 380 corrects, processes, or edits the input image data. The printer image processing unit 390 performs processing suitable for the printer 395, such as correction or resolution conversion, on print output image data.

Each module illustrated in FIG. 3B is implemented by the CPU 301 loading a program stored in the storage 304 into the RAM 302 and executing the program. FIG. 3B illustrates the software configuration of the MFP 0203.

The MFP 0203 includes, as software modules, a servlet service 354, a user interface (UI) control unit 353, an application management unit 352, a storage control unit 356, an application execution control unit 355, a standard function control unit 351, a timer management unit 359, and a job execution history control unit 357.

The servlet service 354 is a module that receives a HyperText Transfer Protocol (HTTP) access request when the request is transmitted via the network I/F 310, and then assigns processing to a module (the application management unit 352 or the standard function control unit 351) based on the accessed URL.

The UI control unit 353 is a module that displays a screen on the operation unit 312, receives an operation from the user, and notifies an appropriate module (the application management unit 352 or the standard function control unit 351) of information about the operation. The application management unit 352 is a module that manages installation and activation of extension applications 440 (see FIG. 4).

Figure 4:
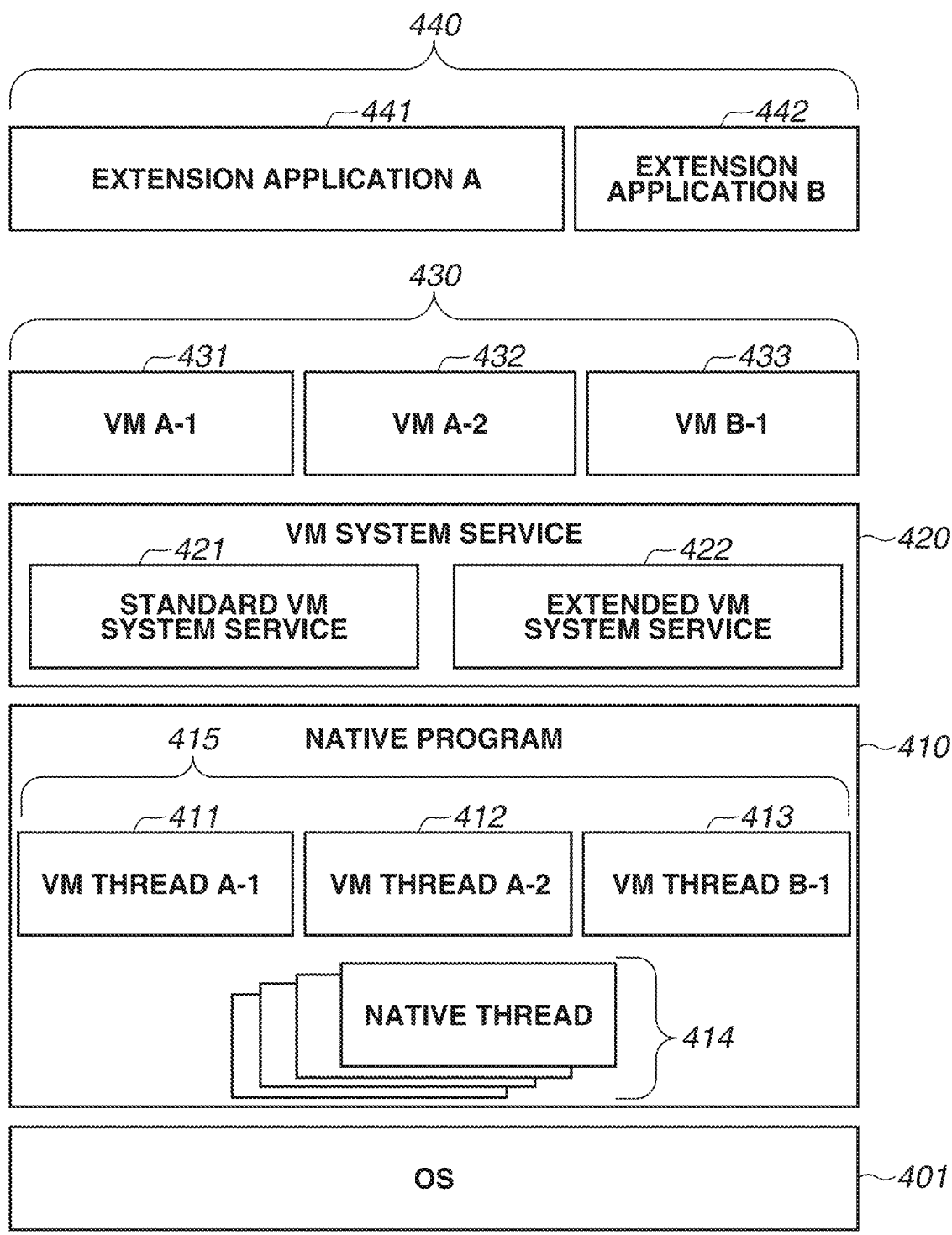
FIG. 4 is a diagram illustrating a software hierarchical structure of the MFP.

The application execution control unit 355 is a module that controls the execution of the extension applications 440 activated by the application management unit 352. More specifically, the application execution control unit 355 controls virtual machine (VM) threads 415, a VM system service 420, VMs 430, and the extension applications 440, which are illustrated in FIG. 4.

The storage control unit 356 is a module that records and manages programs of the extension applications 440 and setting information.

The application execution control unit 355 accesses the storage control unit 356 and reads out the programs. In addition, each of the modules accesses the storage control unit 356, and refers to and sets a setting value.

The standard function control unit 351 is a module that controls a copy function and a facsimile function, which are standard functions of the MFP 0203, and performs other control in the MFP 0203 (e.g., control of the USB host I/F 313). The standard function control unit 351 also manages the executed copy function or facsimile function as a job, and requests the job execution history control unit 357 to record the execution result of the job. The job execution history control unit 357 requests the storage control unit 356 to record the execution result of the job as a history in order to keep the result as a history in a storage.

The timer management unit 359 acquires information about the current time from the RTC 315, detects the lapse of a predetermined time, and notifies the application management unit 352 of the lapse. In response to the notification from the timer management unit 359, the application management unit 352 requests the application execution control unit 355 to perform application timer processing.

The relationship between the OS 401, the VMs 430, and the extension applications 440 will be described in detail. FIG. 4 illustrates a software hierarchical structure of the MFP 0203.

A native program 410 for controlling image processing units, such as a printer, a facsimile, and a scanner, operates on the OS 401. The VMs 430 also operate on the OS 401, as the execution environment of the extension applications 440. Each of the VMs 430 is a module that interprets a program for controlling a corresponding one of the extension applications 440, and executes the program. The extension applications 440 operate on the VMs 430. The program operating on each of the VMs 430 operates in response to a command dedicated for the VMs 430 that is different from a command operating on the CPU 301. This command is called a byte code. On the other hand, the command dedicated for the CPU 301 is called a native code. Each of the VMs 430 interprets and processes the byte codes sequentially, so that the native code and the byte codes operate on the CPU 301. The VMs 430 are classified into a type of directly and sequentially interpreting and processing the byte codes, and a type of converting the byte code into the native code and executing the native code. The VMs 430 according to the present exemplary embodiment are of the former type, but may be of the latter type.

Generally, if the types of CPUs are different from each other, commands operating on the CPUs are incompatible with each other. Similarly, if the types of VMs are different from each other, commands operating on the VMs are incompatible with each other. In the present exemplary embodiment, the extension applications 440 are assumed to be described in Lua language, but may be described in another language. A script described in the Lua language is converted into a byte code dedicated for the Lua language, and the byte code is executed on each of the VMs 430 dedicated for the Lua language. Since the byte code dedicated for the Lua language is different from a command code directly executable by the CPU 301, the byte code dedicated for the Lua language cannot be directly executed by the CPU 301. The VMs 430 dedicated for the Lua language are configured with the command code of the CPU 301, as software modules that sequentially interpret and execute the byte codes dedicated for the Lua language. The VMs 430 dedicated for the Lua language may be configured as dedicated hardware that interprets and executes the byte codes dedicated for the Lua language.

The native program 410 includes native threads 414 for controlling the image processing units, such as a printer, a facsimile, and a scanner, and the VM threads 415 for running the VMs 430. The VM threads 415 corresponding to the number of VMs 430 exist. In this example, the three VM threads 415, i.e., a VM thread A-1 (411), a VM thread A-2 (412), and a VM thread B-1 (413) are generated.

The VM system service 420 is a utility library shared by the extension applications 440. By invoking a function of the VM system service 420 from each of the extension applications 440, the development speed of each of the extension applications 440 can be increased. In addition, the VM system service 420 can access each module of the MFP 0203. The VM system service 420 includes a standard VM system service 421 to be operated as a VM at minimum, and an extended VM system service 422 that accesses each module of the MFP 0203 and provides an OS function. The standard VM system service 421 includes a function of loading the extension applications 440. Each of the VMs 430 executes an application program interface (API) specified by a byte code in a corresponding one of the extension applications 440, so that the VM system service 420 associated with the API is invoked. A drawing API for performing desired drawing on the screen of the operation unit 312, and a job control API for issuing a request to execute a desired job such as a copy job or a scan job in the MFP 0203 are provided to the extended VM system service 422.

The VMs 430 execute the extension applications 440. The VMs 430 are generated for the respective threads of the extension applications 440. In FIG. 4, a VM A-1 (431) and a VM A-2 (432) for running two threads in an extension application A (441) are generated. Also in FIG. 4, a VM B-1 (433) for running one thread in an extension application B (442) is generated.

On a main menu screen to be displayed on the operation unit 312 of the MFP 0203, an icon for each of the extension applications 440 is displayed. If the operation unit I/F 306 detects a selection of the icon by the user via the operation unit 312, the operation unit I/F 306 transmits a notification of the detection to the CPU 301. The CPU 301 that has received the notification activates one of the extension applications 440 that corresponds to the icon selected by the user.

In the following description, the mechanism (the VM system service 420 and the VMs 430) for running the extension applications 440 on the MFP 0203 will be referred to as the application framework.

Client Terminal

Figure 5A:
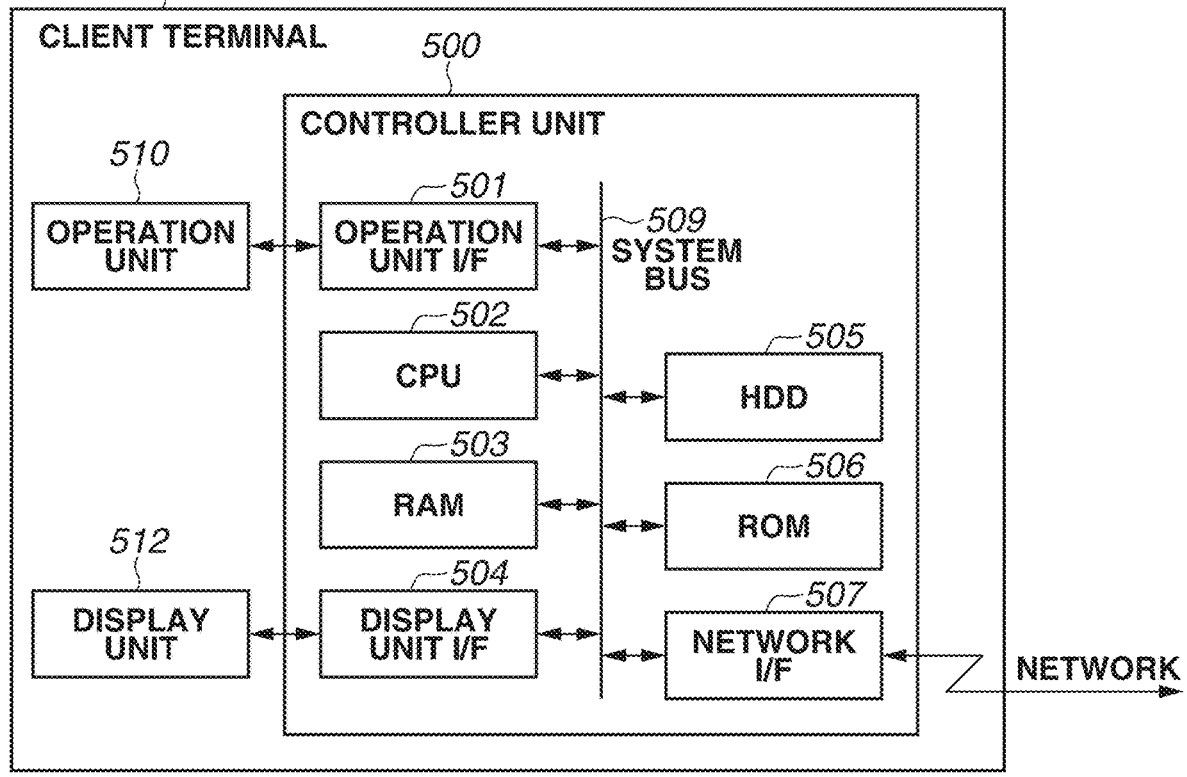
FIG. 5A is a diagram illustrating a hardware configuration of a client terminal.

As a representative of general client terminals that access the authoring system 0101, the client terminal 0240 used by the system user 0202 will be described. A configuration of the client terminal 0240 to be described next may be applied to a client terminal used by the system administrator 0102, the tenant A administrator 0103, the tenant B administrator 0104, the tenant C administrator 0105, or the system developer 0201. FIG. 5A illustrates a hardware configuration of the client terminal 0240.

The client terminal 0240 is an external terminal (an information processing terminal) that accesses the authoring system 0101. The client terminal 0240 includes a controller unit or control circuit 500, an operation unit or circuit 510, and a display unit or circuit 512. The controller unit 500 is connected to hardware components via a system bus 509 to exchange information with the hardware components. The controller unit 500 loads a program, such as an OS or a web browser, recorded on a ROM 506 or an HDD 505 into a RAM 503. The loaded programs are sequentially processed by a CPU 502. The operation unit 510 is a reception unit that receives a user's operation. The operation unit 510 is connected to an operation unit I/F 501, and the CPU 502 is notified of information about the user's operation received by the operation unit 510, via the operation unit I/F 501. The information about the user's operation is processed by a program operating on the CPU 502. Accordingly, the user's operation is processed, and a result of the operation is displayed on the display unit 512 connected to a display unit I/F 504, or transmitted to a network connected to a network I/F 507.

In the present exemplary embodiment, a web browser is executed on the client terminal 0240, and the authoring system 0101 illustrated in FIG. 1 is accessed via the web browser. The client terminal 0240 may be a general PC, or may be a mobile terminal such as a smartphone.

Figure 6:
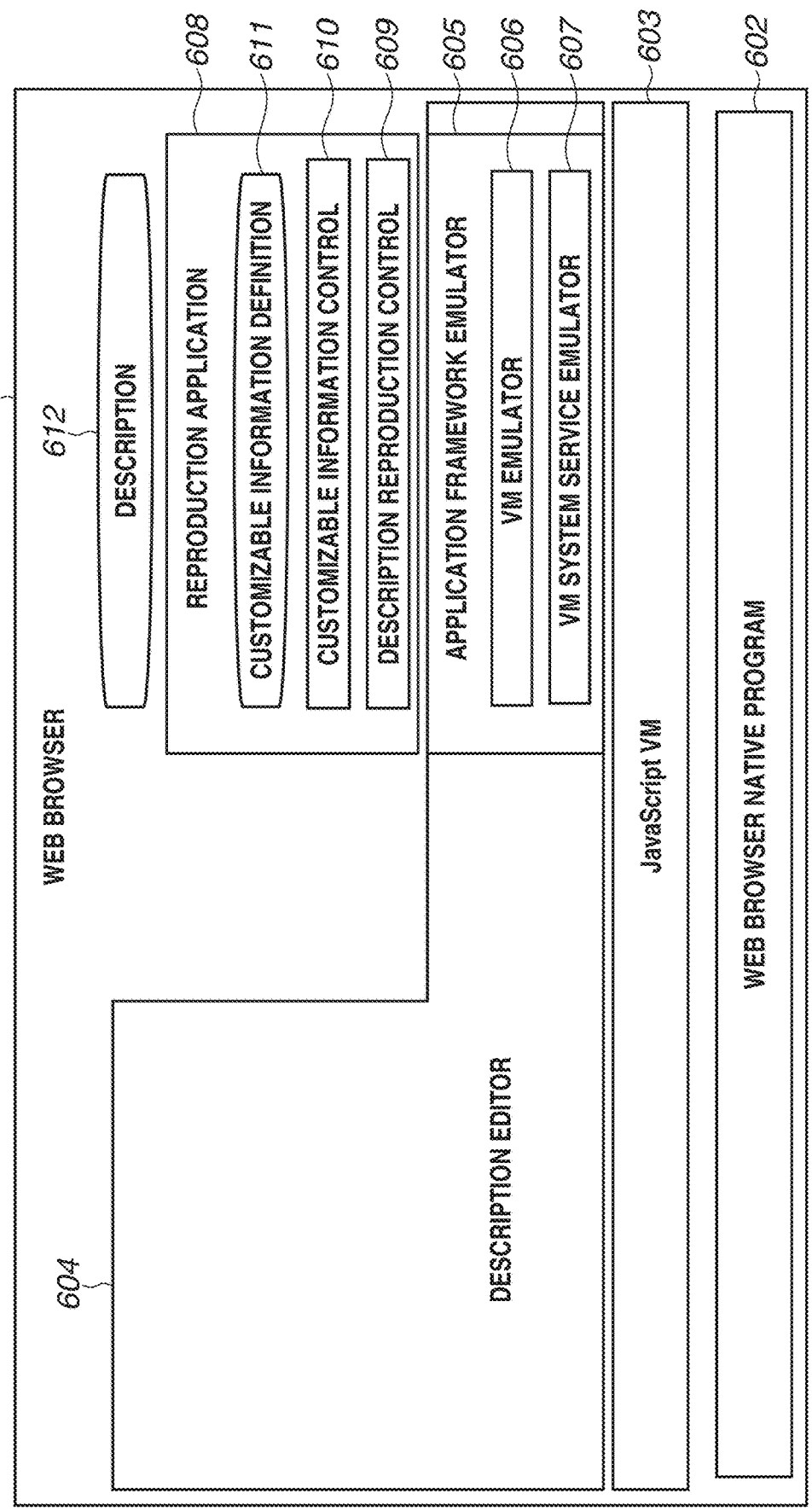
FIG. 6 is a diagram illustrating a web browser that displays the description editor.

Next, a case where the client terminal 0240 executes a description editor on a web browser will be described. FIG. 6 is a block diagram of a web browser 601 that displays a description editor 604.

The web browser 601 is software for connecting to a web server, and is capable of displaying a web page, executing a program, and the like. The web browser 601 is capable of executing a JavaScript VM 603 on a web browser native program 602 that is a native program for running the web browser 601. The JavaScript VM 603 is a program for running JavaScript on the web browser 601.

The description editor 604 is a program written in JavaScript, and is an example of the description editor 0207 illustrated in FIG. 2A. The description editor 604 is executed on the JavaScript VM 603. The description editor 604 is a program that provides an application editing environment.

The description editor 604 also functions as an application framework emulator 605. The application framework emulator 605 performs the emulation of the application framework for executing a program written in a language different from JavaScript, on the web browser 601. The application framework emulator 605 is an example of the framework emulator 0208 illustrated in FIG. 2A. In the present exemplary embodiment, the application framework emulator 605 performs the emulation of the execution environment of the same language as the language of an application executed on the MFP 0203. In addition, the application framework emulator 605 includes a VM emulator 606 and a VM system service emulator 607. These emulators emulate the operations of the VMs 430 and the VM system service 420 illustrated in FIG. 4, on JavaScript, and are programs written in JavaScript.

A reproduction application 608 is an application (a reproduction program) that operates based on the description customized by the user. The reproduction application 608 is configured similarly to an application to be executed on the application framework in the MFP 0203. FIG. 6 illustrates a configuration in which the reproduction application 608 is executed on the application framework emulator 605. The reproduction application 608 includes a customizable information control 610 that processes an inquiry from the VM system service 420 about customizable component information. The reproduction application 608 also includes a customizable information definition 611, and a description reproduction control 609 for reproducing a provided description.

A description 612 is data that holds customized information edited by the user, in a format reproducible by the reproduction application 608. If the user specifies the details of editing (issues an edit instruction) on an edit screen provided by the description editor 604, the description editor 604 generates the description 612. The description editor 604 then reproduces the description 612 using the reproduction application 608 operating on the application framework emulator 605. Accordingly, a screen for checking the operation of a customized application is provided to the user on the web browser 601.

In the present exemplary embodiment, JavaScript is used as a programming language for the description editor 604, but the description editor 604 may be written in a code directly executable on another web browser, such as WebAssembly, for example.

The reproduction application 608 to be executed by the description editor 604 may not necessarily be identical to the reproduction application to be executed on the MFP 0203. For example, an operation check application obtained by extracting, from the reproduction application, a portion corresponding to description reproduction control that is directly related to customization may be loaded.

Figure 5B:
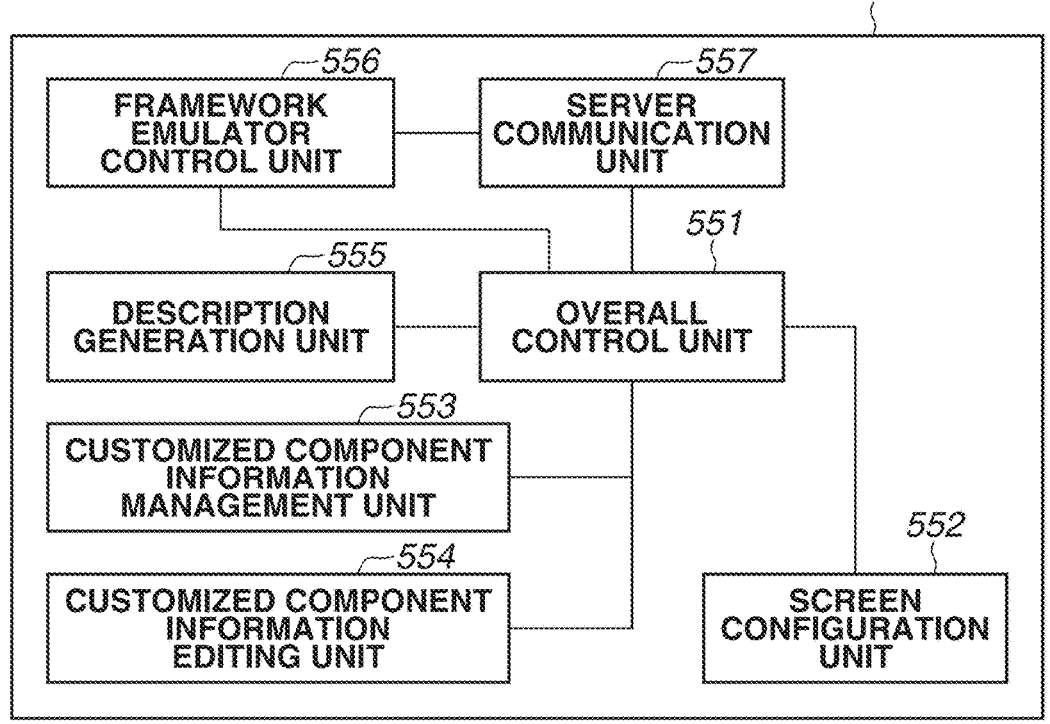
FIG. 5B is a diagram illustrating a software configuration of a description editor to be executed by the client terminal.

Next, the description editor 604 will be described in detail. FIG. 5B illustrates a software configuration of the description editor 604 to be executed by the client terminal 0240.

The description editor 604 is a program that is downloaded from the server apparatus 0220 by the web browser 601 accessing a predetermined URL and then executed on the web browser 601, and is written in JavaScript. The description editor 604 includes an overall control unit 551, a screen configuration unit 552, a framework emulator control unit 556, a server communication unit 557, a description generation unit 555, a customized component information management unit 553, and a customized component information editing unit 554.

Figure 7A:
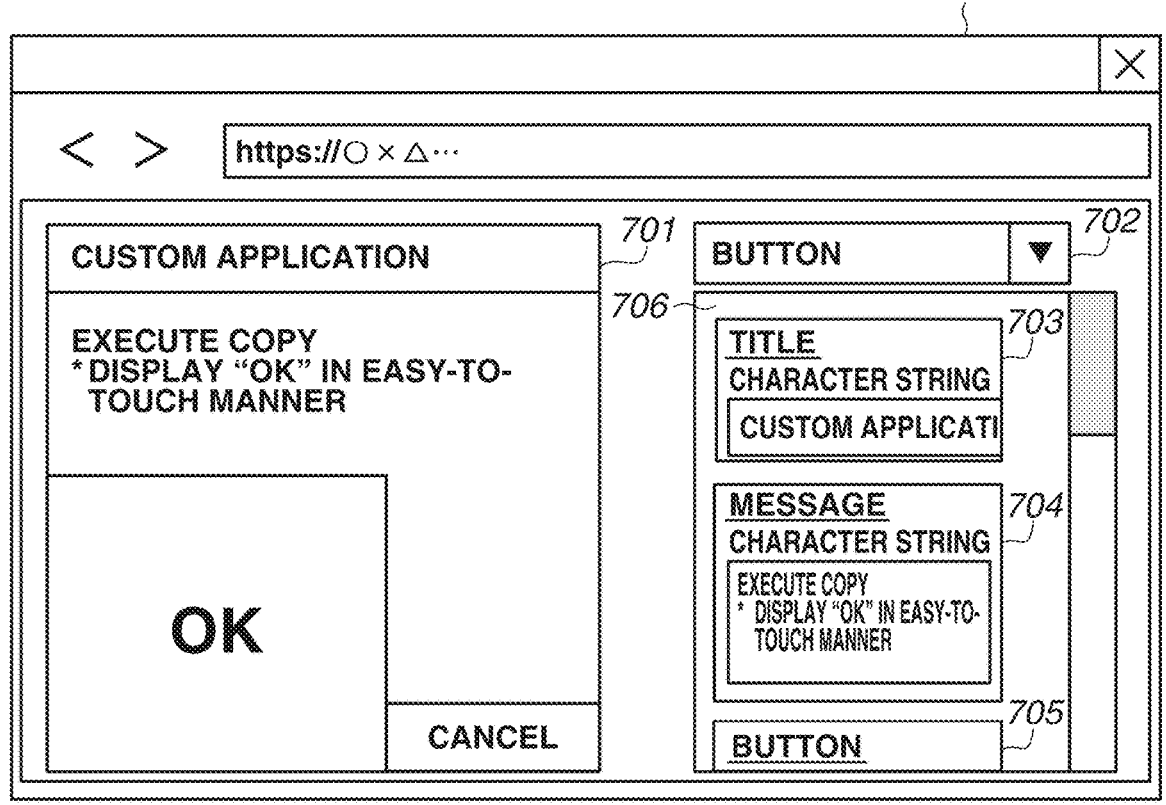
FIG. 7A is a diagram illustrating a screen of the description editor.

The overall control unit 551 is a block that entirely controls the description editor 604. The overall control unit 551 operates in cooperation with the other blocks to control the description editor 604. The screen configuration unit 552 is a block that controls a screen configuration of the description editor 604. The screen configuration unit 552 updates a Hypertext Markup Language (HTML) element and cascading style sheets (CSS) (screen information) that configure a screen 700 illustrated in FIG. 7A. The screen configuration unit 552 also receives a user's operation and notifies the overall control unit 551 of the user's operation (the editing operation). In response to the notification, the overall control unit 551 performs control appropriately. In a case where the notification indicates information about an operation performed on a display region 701 (see FIG. 7A) of an application screen image, the overall control unit 551 notifies the framework emulator control unit 556 of the operation information. For example, in a case where the user clicks the display region 701 of the application screen image, the framework emulator control unit 556 is notified of information indicating that a predetermined point on an application execution screen has been clicked. The framework emulator control unit 556 is a block that executes the reproduction application 608 for reproducing the customized description (the description 612), on the Web. Because the reproduction application 608 is configured to operate on the application framework in the MFP 0203, the reproduction application 608 cannot be directly executed on the web browser 601. The framework emulator control unit 556 performs emulation for executing the reproduction application 608 designed for the MFP 0203 on the Web. The framework emulator control unit 556 receives a notification of screen operation information from the overall control unit 551, and notifies the reproduction application 608 to be executed in the framework emulator control unit 556, of the operation information. The reproduction application 608 that has received the notification performs screen update corresponding to the operation. The screen update is implemented by a screen drawing API in the application framework. The screen drawing API is replaced with an image rendering API in the web browser 601 by the framework emulator control unit 556, and an application display screen is displayed in the display region 701 of the application screen image illustrated in FIG. 7A. The customized component information management unit 553 is a block that acquires customizable component information from the reproduction application 608, and converts the acquired information into a format usable by the description editor 604, and holds the information. Based on this component information, the screen configuration unit 552 configures a component list 702 (see FIG. 7A) and a display region 706 (see FIG. 7A) for displaying customized setting information. The customized component information editing unit 554 is a block that manages current setting information about a customized component. Based on this setting information, the screen configuration unit 552 configures the display region 706 for displaying the customized setting information. The description generation unit 555 is a block that generates the description 612 based on the current setting information held by the customized component information editing unit 554. The description 612 is then provided to the reproduction application 608 via the framework emulator control unit 556. Accordingly, the reproduction application 608 reproduces the description 612, so that the display region 701 of the application screen image illustrated in FIG. 7A is updated.

The server communication unit 557 controls communication with the server apparatus 0220. The communication with the server apparatus 0220 includes communication for storing the component setting information held by the customized component information editing unit 554, into the server apparatus 0220, and download of the reproduction application 608 to be executed by the framework emulator control unit 556. This makes it possible to provide an editing function suitable for the reproduction application 608 without changing the description editor 604, even if the customizable component information in the reproduction application 608 fluctuates or an operation change occurs.

Editing of Description

An execution screen of the description editor 604 for creating a custom application will be described first. FIG. 7A illustrates the screen 700 of the description editor 604. When the user accesses the authoring system 0101 from the web browser 601, and starts to customize an application, the screen 700 is displayed in the web browser 601. The screen 700 is configured with the HTML element, JavaScript, and CSS that are downloaded from the server apparatus 0220. A result obtained by the web browser 601 interpreting these and performing screen rendering is displayed. In the present exemplary embodiment, a case where a custom application for making it easy to select an copy execution button is created in response to a request from a customer will be described as an example. A plurality of items (objects) is arranged on the screen 700, and an application editing environment is provided to the user. Major components of the screen 700 will be described next.

The display region 701 is an image display region for displaying an execution image of the application (the application being edited) in which the information customized by the user is reflected. In the present exemplary embodiment, an example in which the display region 701 is configured using an HTML canvas element will be described, but may be configured using another renderable HTML element. Such a configuration enables the user to perform customization while viewing the display region 701 and checking whether desired customization is performed.

The component list 702 is a pull-down display object for displaying a list of customizable (addable) display components. The user selects a desired component from the component list 702 and adds the selected component, so that the user can customize the application by adding the component thereto. Examples of editable components include a button to which a function can be associated, title information, and message information.

Because a result of adding the component is immediately reflected in the display region 701, the user can easily confirm the state of customizing the application.

The display region 706 is a customized setting information display region for displaying currently-set components and information set in the components. FIG. 7A illustrates a state in which a title component 703, a message component 704, and a button component 705 are set in the display region 706. By editing the information about the components displayed in the display region 706, the user can customize the components. For example, assume that a character string "custom application" displayed in the title component 703 is edited to read "test application". In this case, the edited character string is reflected in the display region 701, and a region where the character string "custom application" is displayed is updated to display the character string "test application". By editing parameters of each of the components, a size or a layout of the component can also be changed.

Next, an execution flow of the description editor 604 will be described. FIG. 8 is a sequence diagram illustrating processing to be performed between software modules of the description editor 604. Each processing is implemented by the controller unit 500. More specifically, each processing is implemented by the CPU 502 acquiring a program of the web browser 601 from the ROM 506, loading the program into the RAM 503, and executing the description editor 604 via the JavaScript VM 603.

In the execution flow of the description editor 604, first, in step S800, the overall control unit 551 transmits a screen configuration request to the screen configuration unit 552. The screen configuration unit 552 configures an edit screen like the screen 700 illustrated in FIG. 7A. At this time, because customizable component information is undetermined, the component list 702 and the display region 706 for displaying the customized setting information are configured in an empty state. In step S801, the overall control unit 551 transmits a reproduction application download request to the server communication unit 557. In response to the request, the server communication unit 557 downloads the reproduction application 608 from the server apparatus 0220. In step S802, the server communication unit 557 transmits the reproduction application 608 to the overall control unit 551. In step S803, the overall control unit 551 transmits a reproduction application execution request to the framework emulator control unit 556. In response to the request, the framework emulator control unit 556 executes the reproduction application 608. In step S804, the overall control unit 551 transmits a customizable component information acquisition request to the framework emulator control unit 556. In step S805, in response to the request, the framework emulator control unit 556 transmits a customizable component information acquisition request to the reproduction application 608, and returns the customizable component information (the customizable information definition 611) acquired from the reproduction application 608 to the overall control unit 551. In step S806, the overall control unit 551 transmits the acquired customizable component information to the customized component information management unit 553. The customized component information management unit 553 converts the received information into the data format usable by the description editor 604. In step S807, the overall control unit 551 transmits a screen update request to the screen configuration unit 552. In this step, because customizable component information is determined, the information is reflected in the component list 702 and the display region 706 for displaying the customized setting information, so that the user can customize the components. In step S808, the user selects a component from the component list 702 and adds the selected component. In step S809, the screen configuration unit 552 receives a notification of the change (the addition) and transmits information about the user's operation to the overall control unit 551. In step S810, the overall control unit 551 notifies the customized component information editing unit 554 of the changed setting value. In step S811, the customized component information editing unit 554 confirms the setting value and transmits the current setting value to the overall control unit 551. In step S812, the overall control unit 551 requests the description generation unit 555 to generate the description 612 based on the current setting value. In step S813, the description generation unit 555 generates the description 612 corresponding to the current setting value, and transmits the description 612 to the overall control unit 551. In step S814, the overall control unit 551 transmits a notification of the description 612 to the framework emulator control unit 556. The framework emulator control unit 556 reproduces the description 612 using the reproduction application 608. Accordingly, the display region 701 of the application screen image is updated. Lastly, in step S815, the overall control unit 551 transmits a storage request for storing the edited customized component setting information to the server communication unit 557. In response to the request, the server communication unit 557 requests the server apparatus 0220 to store the customized component setting information. Accordingly, the customized application information set by the user is stored into the server apparatus 0220. When the user customizes the application next time, the stored information is loaded, so that the user can customize the application in a state in which the information edited by the user has been reflected.

Next, component information and the description 612 will be described. FIG. 13 shows the overall diagram for customizable component information. FIGS. 13A and 13B illustrate an example of the customizable information definition 611 acquired in steps S804 to S805 of FIG. 8. The customizable information definition 611 is information held in the reproduction application 608, and may vary depending on the version of the reproduction application 608. The description editor 604 can update the version of the reproduction application 608 by accessing the reproduction application resource 0206. If the version of the reproduction application 608 and the version of the description 612 are different (incompatible) from each other, this can cause an error. To address the issue, in the present exemplary embodiment, the customizable information definition 611 serving as a basis for the description 612 is acquired from the reproduction application 608. This makes it possible to prevent the incompatibility between the version of the reproduction application 608 and the version of the description 612.

In application customization, the description editor 604 makes an inquiry of the reproduction application 608 to acquire the customizable information definition 611. In the present exemplary embodiment, the customizable information definition 611 is represented in a JavaScript Object Notation (JSON) format that is highly compatible with a web browser, but another format may be used. The customizable component information (the customizable information definition 611) includes graphical user interface (GUI) component information 1301 and job component information 1302.

The GUI component information 1301 indicates information about a customizable GUI component in the reproduction application 608. The GUI component information 1301 includes an information group 1303 and an information group 1304.

The information group 1303 is an information group about a GUI component of a title, and includes a component ID 1305, localize 1306, attrib 1307, localize 1309, and data_type 1310. The GUI component information 1301 includes the component ID 1305 for identifying the component, the localize 1306 indicating the name of the component, and the attrib 1307 indicating setting information about the component. The component ID 1305 is the identifier of the component, and specifies a unique character string among all components. This character string is information to be used by the description editor 604 and used in the reproduction application 608, and not to be displayed on a GUI. The localize 1306 indicating the component name is information to be displayed in the component list 702 illustrated in FIG. 7A. The localize 1306 indicating the component name holds information about the component name in each language, and is displayed based on the language setting of the web browser 601. The attrib 1307 indicating the setting information about the component includes item information to be set in the component. Because the information group 1303 is the information group about the GUI component of the title, the attrib 1307 includes the setting information about the title as the item information. The setting information about the title includes a setting ID 1308 for identifying the setting information, the localize 1309 indicating the name of the setting information, and the data_type 1310 indicating a type of a setting value of the setting information. The setting ID 1308 is the identifier of the setting information, and specifies a unique character string in the information group 1303. The same character string may be used in a different information group such as the information group 1304, for example.

The character string in the setting ID 1308 is information to be used by the description editor 604 and used in the reproduction application 608, and not to be displayed on a GUI. The localize 1309 indicating the name of the setting information is information to be displayed in the title component 703 in the setting information about the components in the display region 706 for displaying the customized setting information. The localize 1309 indicating the name of the setting information holds the name of the setting information in each language, and is information to be displayed based on the language setting of the web browser 601. The data_type 1310 indicating the type of the setting value specifies a data type settable as the setting value. "string" set in the data_type 1310 indicates that any character string is settable. The data_type 1310 includes "position" 1311 indicating display position information about a GUI component. The data-type 1310 includes "change_panel" 1312 for moving to another panel when a button is pressed. The data_type 1310 includes "int_100" 1315 for inputting the number of copies of a copy job, and "select" 1316 for selecting data from among predetermined items. The data_type 1310 indicating the setting value type is information about a supported type predetermined by the description editor 604 and the reproduction application 608. The setting information may include a plurality of pieces of information depending on the component. For example, the information group 1303 includes a single piece of setting information, whereas the information group 1304 includes three pieces of setting information.

The job component information 1302 has an information structure similar to that of the GUI component information 1301.

In this example, the job component information 1302 holds information indicating the setting values related to the number of copies and the color mode of a copy job. A job identification ID 1313 is an identifier for identifying the job, and "attrib" 1314 indicates customizable parameter information about the job. In this example, the number of copies and the color mode are customizable parameters. "data_range" 1317 is information indicating candidates settable as a color mode. Information about the candidates includes a candidate ID 1318 and localize 1319 that indicates a candidate name.

Based on the information described above, the screen configuration unit 552 determines how to enable the user to set customizable component information, and constructs an appropriate setting screen based on the determination.

Next, a structure of the description 612 to be generated by the description editor 604 that has constructed the screen based on the customizable information definition 611 illustrated in FIGS. 13A and 13B will be described. FIG. 11 shows the overall description 612. FIGS. 11A and 11B illustrate an example of the description 612. More specifically, FIGS. 11A and 11B illustrate an example of the description 612 corresponding to the application setting information customized on the screen 700 illustrated in FIG. 7A. In other words, FIGS. 11A and 11B illustrate the description 612 corresponding to the application that displays a copy execution confirmation screen and executes a copy job in response to the press of an OK button. In the present exemplary embodiment, the description 612 is written in the JSON format that is highly compatible with a web browser. Another format may be used as the format of the description 612.

The description 612 is roughly divided into panel information 1101 and panel information 1102. The panel information 1101 stores component information, and customized information about each component. The component information includes title component information 1103, message component information 1109, OK button component information 1110, and cancel button component information 1111. The customized information about each component includes component ID information 1104, component setting information 1105, component parameter information 1106, a component parameter data type 1107, and component parameter data 1108. The component ID information 1104 is identification information indicating the component corresponding to the customized information. In this example, the component ID information 1104 indicates the customized information about the "title" component. The component setting information 1105 indicates setting information about the component. The component parameter information 1106 indicates the customized information about a parameter of the component. The component parameter data type 1107 indicates a data type of the component parameter. The component parameter data 1108 indicates a setting value of the component parameter. In a case where "string" is set in the component parameter data type 1107, information about a localized character string is specified as the setting value.

It can be thus seen that the title component information 1103 indicates the "title" component and the "title" parameter, and specifies the localized character string "custom application" as the setting value of the parameter. Customized information is similarly set in the message component information 1109, the OK button component information 1110, and the cancel button component information 1111.

The panel information 1102 stores information for executing a job. In job execution component information 1112, "execute_job" is specified as a component for executing a job. Information about the job execution component information 1112, includes job identification ID 1114 indicating the job to be executed and a job parameter 1115 of the job, as parameter setting values. Because in this example, the application for executing a copy job is described, "copy" is specified in the job identification ID 1114. In the job parameter 1115, a parameter for use in executing the job can be registered. In this example, number-of-copies information 1116 and color mode 1117 are registered.

The example of the description 612 described above is read by the description reproduction control 609 of the reproduction application 608, for example. Then, the reproduction application 608 configures the screen corresponding to the description 612, and performs screen transition or job execution control depending on the user's operation.

Framework Emulator

Next, the framework emulator control unit 556 will be described in detail. FIG. 14 illustrates a software block configuration of the framework emulator control unit 556.

The framework emulator control unit 556 is an emulation program for checking the operation of an application designed for the MFP 0203, on the Web. The framework emulator control unit 556 implements the above function by reproducing the VM system service 420 and the VMs 430, which are illustrated in FIG. 4, on the web browser 601.

A VM system service emulator unit 1401 is a block substituting as the VM system service 420, and performs control to connect the application designed for the MFP 0203 and the environment of the web browser 601. The VM system service emulator unit 1401 includes a drawing API emulator unit 1402, a job control API emulator unit 1403, a description control unit 1404, a user operation control unit 1405, and a customizable component information control unit 1406.

The drawing API emulator unit 1402 is a block that performs processing for replacing the API used by the application to draw a screen, with the image rendering API in the web browser 601. The job control API emulator unit 1403 is a block that emulates the control of a job such as a copy job or a scan job in an image forming apparatus. The job control API emulator unit 1403 simply emulates the behavior of the API, and practically does not execute a job. The description control unit 1404 is a block that receives the description 612 generated by the description generation unit 555, and notifies the application of the description 612. In response to the notification, the application reproduces the description 612. The user operation control unit 1405 is a block that receives a notification of screen operation information from the overall control unit 551, and notifies the application of the screen operation information. The customizable component information control unit 1406 is a block that notifies the overall control unit 551 of the customizable component information transmitted from the application. The VM emulator unit 1407 is a block that interprets and executes the application.

Figure 15:
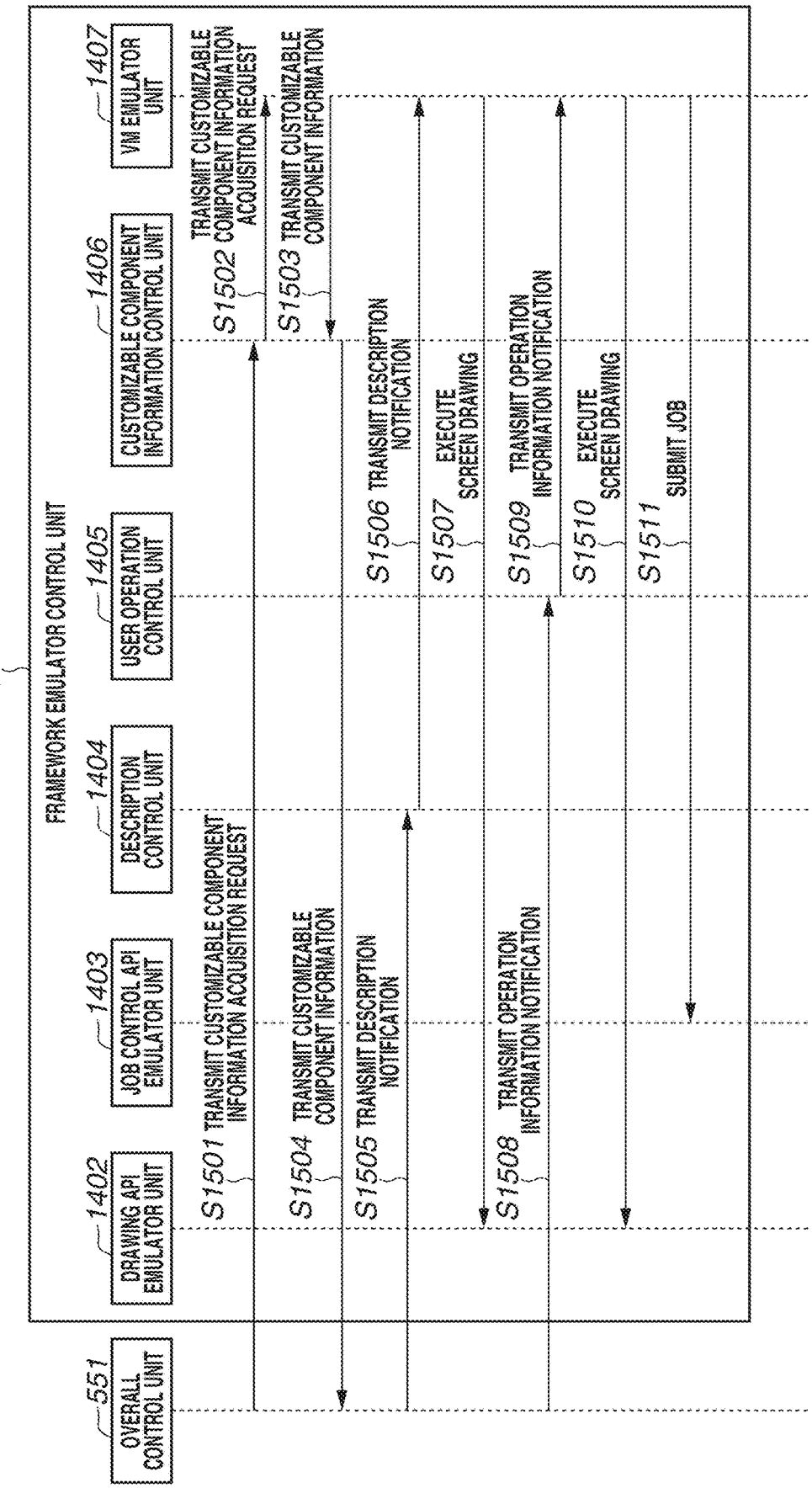
FIG. 15 is a sequence diagram illustrating processing to be performed in the framework emulator control unit.

Next, processing to be performed by the framework emulator control unit 556 will be described in detail assuming that the above-described configuration is used. FIG. 15 is a sequence diagram illustrating internal processing of the framework emulator control unit 556 in the processing performed between the overall control unit 551 and the framework emulator control unit 556 in FIG. 8. Each processing is implemented by the controller unit 500. More specifically, each processing is implemented by the CPU 502 acquiring a program of the web browser 601 from the ROM 506, loading the program into the RAM 503, and executing the description editor 604 via the JavaScript VM 603.

In step S1501, when a customizable component information acquisition request is transmitted from the overall control unit 551, the customizable component information control unit 1406 receives the request. The processing in step S1501 corresponds to the processing in step S804 of FIG. 8.

In step S1502, the customizable component information control unit 1406 transmits an acquisition request for acquiring the customizable component information (the customizable information definition 611), to the application being executed in the VM emulator unit 1407. Upon receiving the acquisition request, in step S1503, the application being executed in the VM emulator unit 1407 transmits the customizable information definition 611 as a response.

In step S1504, the customizable component information control unit 1406 notifies the overall control unit 551 of the customizable information definition 611 acquired from the application.

In step S1505, when a notification of the description 612 is transmitted from the overall control unit 551, the description control unit 1404 receives the notification. The processing in step S1505 corresponds to the processing in step S814 of FIG. 8. In step S1506, the description control unit 1404 transmits a notification of the description 612 to the application being executed in the VM emulator unit 1407.

In step S1507, in response to the notification, the application being executed in the VM emulator unit 1407 reads the description 612, and executes the screen drawing API to display the screen set in the description 612.

The screen drawing API is executed by the drawing API emulator unit 1402, and replaced with the drawing API in the web browser 601.

In step S1508, when a notification of operation information is transmitted from the overall control unit 551, the user operation control unit 1405 receives the notification. The processing in step S1508 corresponds to the processing in step S809 of FIG. 8.

In step S1509, the user operation control unit 1405 transmits a notification of the operation information to the application being executed in the VM emulator unit 1407. In response to the notification, the application being executed in the VM emulator unit 1407 performs processing suitable for the user's operation. In a case where the user's operation is a screen update operation (e.g., a screen transition instruction), then in step S1510, a notification of screen drawing is transmitted to the drawing API emulator unit 1402, and the screen drawing API is executed. In a case where the user's operation is a job submission operation, then in step S1511, a notification of job submission is transmitted to the job control API emulator unit 1403, and a job submission API is executed.

As described above, the processing performed by the overall control unit 551 and the framework emulator control unit 556 enables various processing to be performed between the description editor 604 and the application. Various processing includes acquisition of customizable component information, notification of a changed description, reproduction of the changed description, and an operation check of the application during reproduction.

Drawing API

As described above, the description editor 604 provides an operation check environment to the user who is editing the application, by executing the application on the web browser 601 and displaying the details of the execution in the display region 701. The display region 701 is drawn by the drawing API emulator unit 1402. A character string drawing API is a program that acts to render a specified character string in a specified attribute (e.g., color or size). The drawing API emulator unit 1402 emulates the drawing of an application screen on the web browser 601. Thus, the reproducibility of the application screen in the display region 701 depends on a processing method used by the drawing API emulator unit 1402.

The processing method used by the drawing API emulator unit 1402 includes the following three methods.

The first method is to draw a screen using a font provided by a web browser and a rendering method provided by the web browser. In this method, the drawing API emulator unit 1402 uses the character string drawing API provided by JavaScript. The first method has an advantage in that the time taken for drawing is short because the drawing API emulator unit 1402 simply executes the character string drawing API provided by JavaScript. On the other hand, the first method has a disadvantage in that the appearance of the screen displayed on the description editor 604 may differ from the appearance of the screen displayed on the MFP 0203. This is due to the fact that the font data and the rendering method used in rendering differ from those used by the MFP 0203. In addition, because the font data and the rendering method can vary depending on the web browser to be used, it can be said that the first method is environment-dependent.

The second method is to draw a screen using the font used by the MFP 0203, and the same rendering method as that used by the MFP 0203. The second method has an advantage in that a drawn character string can be made close to a character string drawn by the MFP 0203. However, the second method has a disadvantage in that the time taken for drawing is long because the rendering method used by the MFP 0203 is to be emulated on JavaScript.

The third method is to draw a screen using the font used by the MFP 0203 and the rendering method provided by the web browser. The third method has a hybrid characteristic between the first and second methods.

In the present exemplary embodiment, in view of the characteristics of the above-described methods, the user can switch among three modes provided for character string drawing processing. More specifically, the method of drawing a screen using the font provided by a web browser and the rendering method provided by the web browser is provided as a first mode. The method of drawing a screen using the font used by the MFP 0203 and the rendering method provided by the web browser is provided as a second mode. The method of drawing a screen using the font used by the MFP 0203 and the same rendering method as that used by the MFP 0203 is provided as a third mode.

With such a configuration, during a normal operation of the description editor 604, a simple check can be performed using the first mode involving a light load operation. At the time of a final operation check, a precise check for checking whether, for example, a character string does not protrude can be performed using the third mode. In other words, according to the present exemplary embodiment, an optimum drawing method can be selected depending on the situation.

Figure 16:
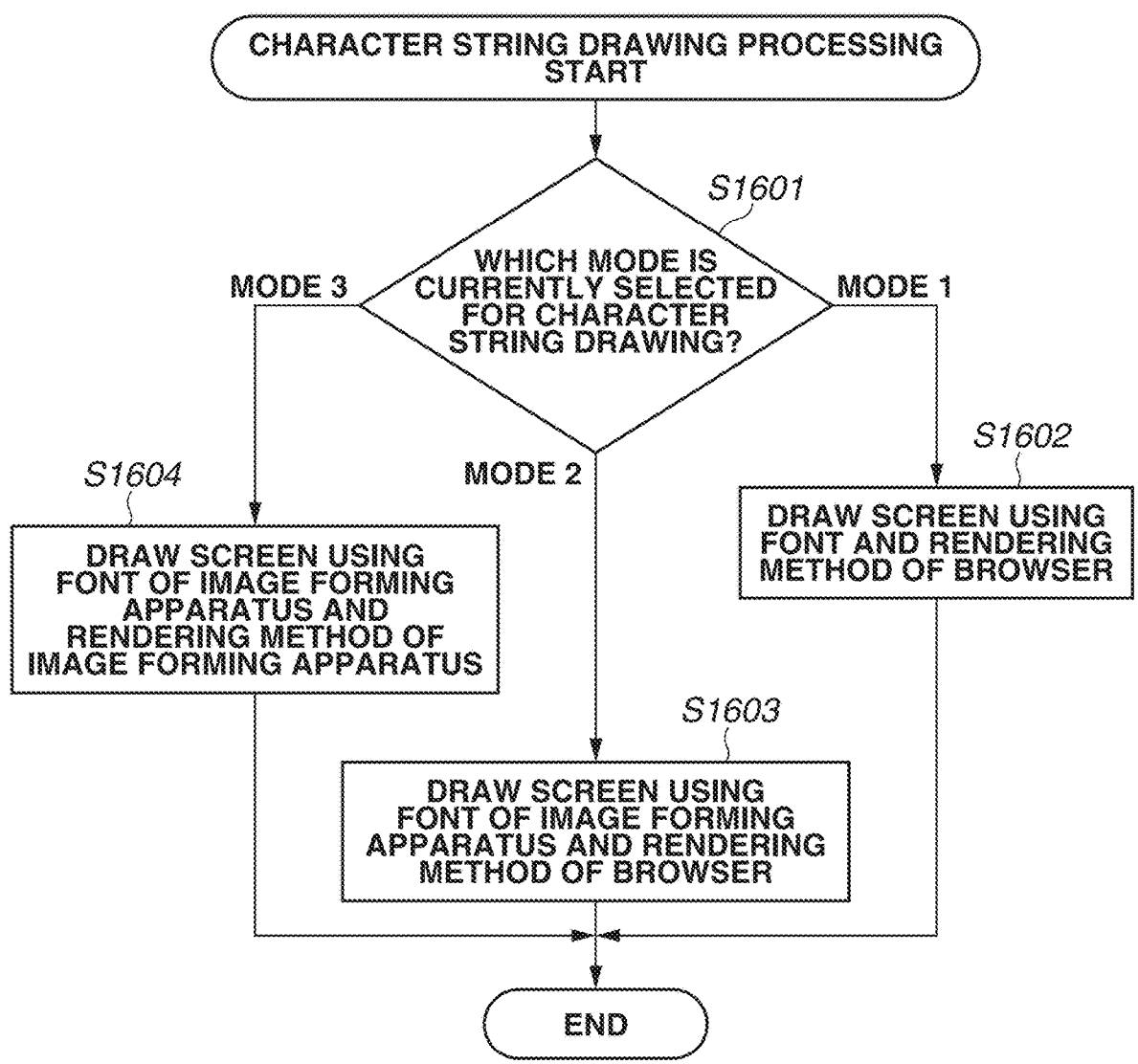
FIG. 16 is a flowchart illustrating character string drawing processing to be performed by the framework emulator control unit.

To implement the above-described control, processing in a flowchart illustrated in FIG. 16 is performed as character string drawing processing. FIG. 16 is a flowchart illustrating the character string drawing processing to be performed by the framework emulator control unit 556. Each processing in FIG. 16 is implemented by the controller unit 500. More specifically, each processing is implemented by the CPU 502 acquiring a program of the web browser 601 from the ROM 506, loading the program into the RAM 503, and executing the description editor 604 via the JavaScript VM 603.

In step S1601, the drawing API emulator unit 1402 identifies the currently-selected character string drawing mode. In a case where the currently-selected character string drawing mode is the first mode ("MODE 1" in step S1601), the processing proceeds to step S1602. In a case where the currently-selected character string drawing mode is the second mode ("MODE 2" in step S1601), the processing proceeds to step S1603. In a case where the currently-selected character string drawing mode is the third mode ("MODE 3" in step S1601), the processing proceeds to step S1604. In step S1602, the drawing API emulator unit 1402 draws a screen using the font and the rendering method that are provided by the web browser 601. In step S1603, the drawing API emulator unit 1402 draws a screen using the font used by the MFP 0203 and the rendering method provided by the web browser 601. In step S1604, the drawing API emulator unit 1402 draws a screen using the font used by the MFP 0203 and the same rendering method as that used by the MFP 0203.

Arranging a dedicated button or switch (not illustrated) on the screen 700 enables the character string drawing mode to be changed at any timing.

Custom Application

Figure 7B:
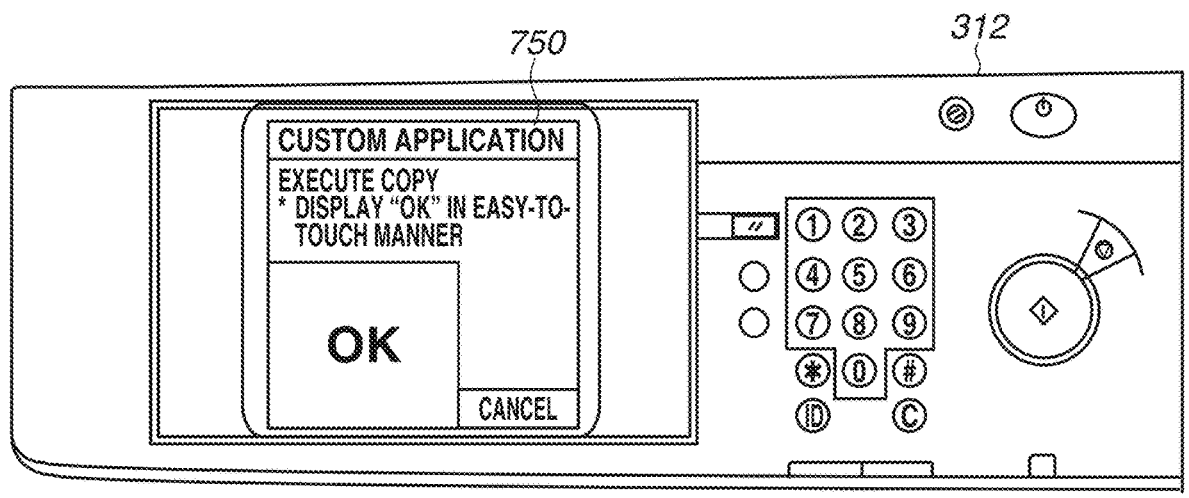
FIG. 7B is a diagram illustrating an execution screen of a custom application on the MFP.

The custom application mentioned in step S912 of FIG. 9 will be described in detail. The description registered in the authoring system 0101 is packaged in step S915, provided to the MFP 0203 as a custom application in step S911, and installed onto the MFP 0203 in step S912. After the custom application is installed, the reproduction application is executed in the MFP 0203, the description is read based on the script, and information specified in the description is reproduced. An execution screen of the custom application is displayed as illustrated in FIG. 7B. FIG. 7B illustrates an execution screen 750 of the custom application on the MFP 0203. The execution screen 750 is the same as the screen displayed in the display region 701 in editing the description. It can be seen from the execution screen 750 that the custom application operates normally. Processing related to custom application installation will be described in detail.

Figure 10:
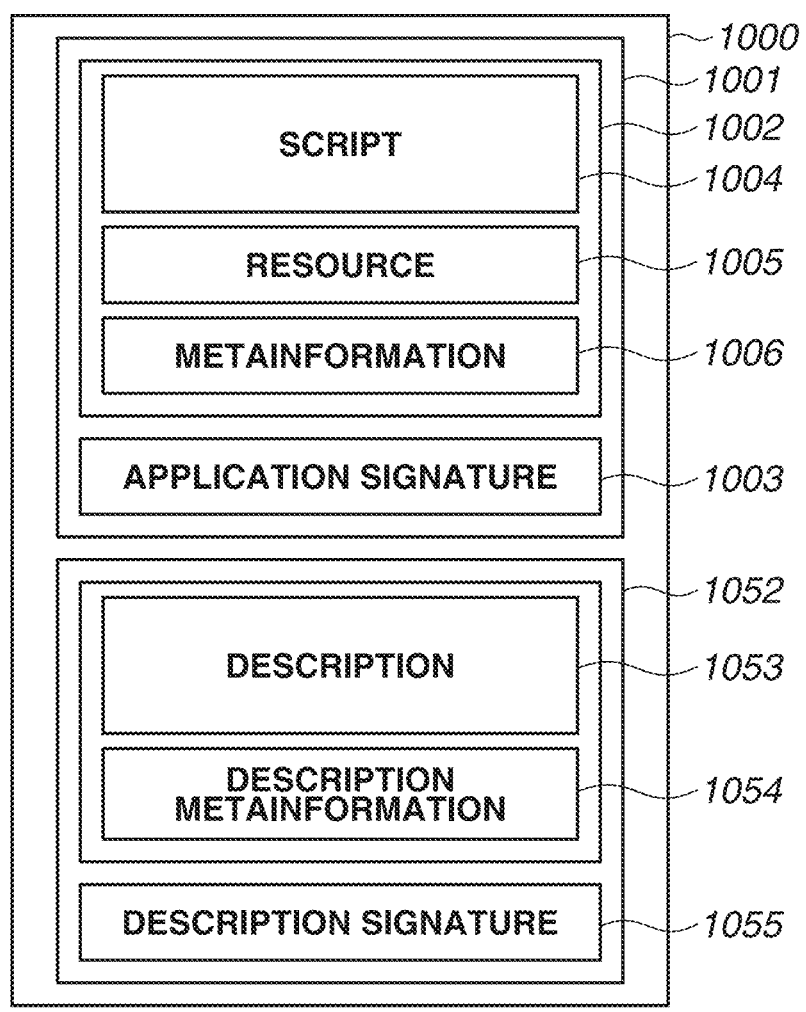
FIG. 10 is a diagram illustrating a data structure of the custom application.

A structure of an install package to be provided to the MFP 0203 by the authoring system 0101 will be described. FIG. 10 illustrates a data structure of an install package 1000.

The install package 1000 is package data including a signed description 1052 and a signed application 1001.

The signed application 1001 includes a reproduction application 1002 and an application signature 1003. The reproduction application 1002 includes a script 1004, a resource 1005, and metainformation 1006. In the present exemplary embodiment, the reproduction application 1002 is the same as the reproduction application 608 held by the description editor 604.

The signed description 1052 includes a description 1053, description metainformation 1054, and a description signature 1055. The description 1053 is generated by the description editor 604, and is data defining the behavior of an application customized by the user. The details of the description 1053 have been described above with reference to FIGS. 11A and 11B. The description metainformation 1054 indicates an identifier (a description identifier), version information, and an application name of the customized application. The description signature 1055 is signature data for guaranteeing the integrity of the description 1053 and the description metainformation 1054. The description signature 1055 is generated using a signing key different from that for the application signature 1003. The signing key is held by the authoring system 0101, and the description signature 1055 is generated as signature data by the description signature affixation 0211.

Processing for installing the install package 1000 described above onto the MFP 0203 will be described in detail. FIG. 12 illustrates a structure of a reproduction application 1201 held in the storage 304 of the MFP 0203 after installation of a custom application onto the MFP 0203. The reproduction application 1201 includes application data 1202 and an application signature 1203. The application data 1202 includes a script 1204, a resource 1205, and metainformation 1206. The script 1204 includes an information control section 1207 and a reproduction control section 1208. The resource 1205 includes a definition 1209. In the application installation processing to be performed by the MFP 0203, each piece of data in the install package 1000 is read out and reconfigured on the storage 304 of the MFP 0203. More specifically, the script 1004 in the install package 1000 is arranged as the script 1204. The resource 1005 in the install package 1000 is arranged as the resource 1205 after installation.

In addition, the metainformation 1206 is stored as information (an identifier) for uniquely identifying the installed application. In other words, the metainformation 1206 is used to distinguish the installed application from other applications installed on the MFP 0203. The metainformation 1206 is also used to identify whether the application is to be version-upgraded in the case of an application version upgrade.

Remarks

As described above, the authoring system 0101 provides an environment in which an application can be easily edited and delivered. This enables personnel, such as servicemen and technical salespersons, to create custom applications. Therefore, it is possible to promptly provide the applications desired by customers.

In the present exemplary embodiment, the customizable information definition 611 is acquired from the reproduction application 608 and used by the description editor 604. This can prevent the incompatibility between the version of the description 612 based on the customizable information definition 611, and the version of the reproduction application 608 that reproduces the description 612.

In the present exemplary embodiment, the mode of the drawing API emulator unit 1402 can be changed by the description editor 604. This makes it possible to use the description editor 604 with an optimum drawing method depending on the situation.

MODIFIED EXAMPLE

In the above-described exemplary embodiment, as an example of the customizable information definition 611, a definition for a copy function has been described. In a modified example, as an example of the customizable information definition 611, a definition for Scan To USB (a job of scanning a document image and storing the resulting data into a USB storage) will be described.

FIG. 17 illustrates an example of the customizable information definition 611 of Scan To USB (a job of scanning a document image and storing the resulting data into a USB storage). Information 1701 and information 1702 define information about supported document sizes. In this example, attention is to be paid to information 1703 and information 1704. Types of the MFP 0203 includes a compact type that can be placed on a desk, and a large type that is placed in a space, such as an office automation (OA) space, in an office. The large type is capable of scanning a document such as a A3 size document, whereas the compact type does not support an A3 size document in some cases. As described above, in a case where the supported size ranges vary depending on the MFP 0203 that executes an application, there is a possibility that the user may erroneously set a parameter. To avoid this, the description editor 604 is notified that the parameter has a dependence on an execution environment. The notification is implemented by using the information 1703 and the information 1704 that are environment dependence information. The information 1703 indicates that a A3 document size is environment-dependent, and the information 1704 indicates that a A4 document size is not environment-dependent. A parameter without such environment dependence information is regarded as an environment-independent parameter.

Figure 18:
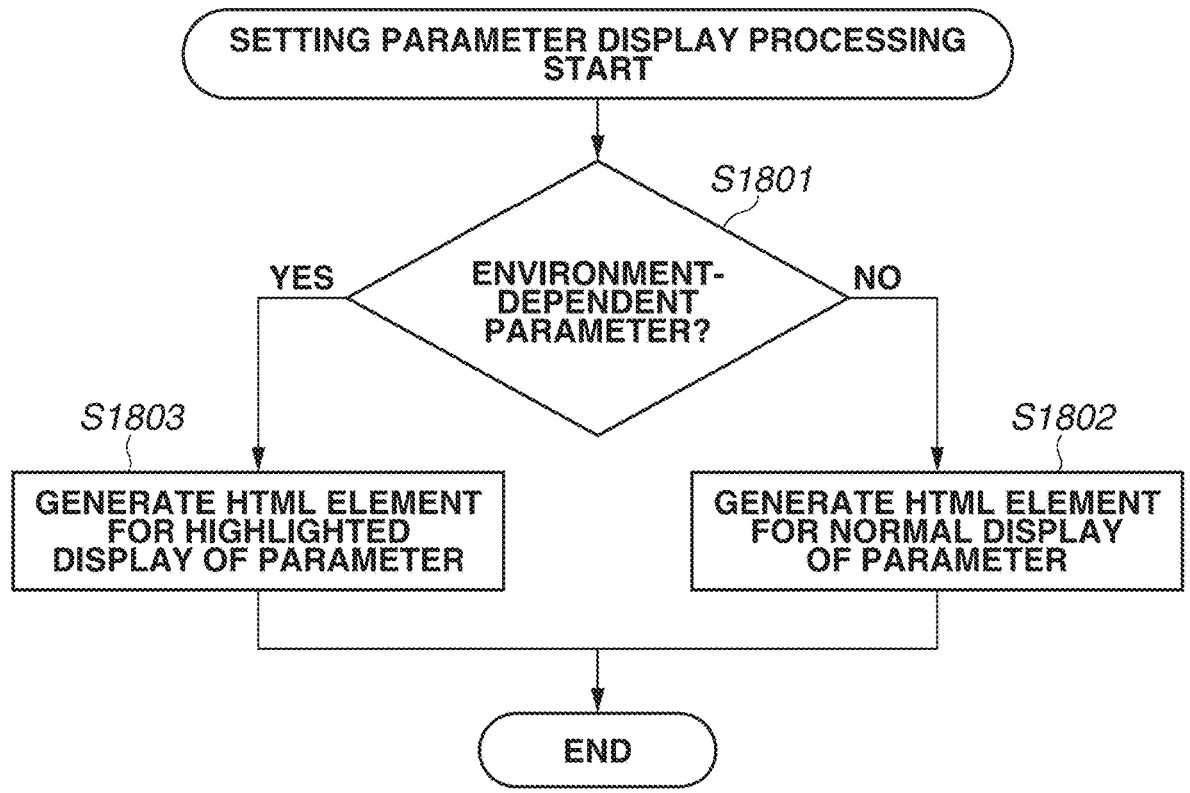
FIG. 18 is flowchart illustrating setting parameter display processing to be performed by the description editor.

Such environment dependence information is used as follows. FIG. 18 is a flowchart illustrating processing to be performed when the screen configuration unit 552 generates a specific HTML element. This HTML element is screen information about a screen that displays a parameter settable in a customizable item. Each processing in FIG. 18 is implemented by the controller unit 500. More specifically, each processing is implemented by the CPU 502 acquiring a program of the web browser 601 from the ROM 506, loading the program into the RAM 503, and executing the description editor 604 via the JavaScript VM 603.

First, in step S1801, the screen configuration unit 552 refers to environment dependence information about a parameter included in the screen to be displayed. In a case where the parameter is not environment-dependent (NO in step S1801), the processing proceeds to step S1802. In a case where the parameter is environment-dependent (YES in step S1801), the processing proceeds to step S1803. In step S1802, because the parameter is usable without environment dependence, the screen configuration unit 552 generates an HTML element for normal display without highlighted display. In step S1803, to notify the user that the parameter is environment-dependent, the screen configuration unit 552 generates an HTML element for highlighted display.

Remarks

As described above, in the modified example, environment dependence information is used in the customizable information definition 611.

This makes it possible to provide an custom application that can operate appropriately even in a case where the custom application is assumed to be installed onto a device with models having various configurations.

An exemplary embodiment of the disclosure can also be implemented by supplying a program for implementing one or more functions according to the above-described exemplary embodiment to a system or an apparatus via a network or a storage medium, and causing one or more processors in a computer of the system or the apparatus to read out and execute the program. An exemplary embodiment of the disclosure can also be implemented by a circuit (e.g., an application specific integrated circuit (ASIC)) for implementing one or more functions according to the above-described exemplary embodiment. In addition, a storage described as an HDD in the exemplary embodiment may be replaced with a semiconductor storage such as a solid state drive (SSD). An exemplary embodiment of the disclosure may be applied to a system including a plurality of devices, or may be applied to an apparatus including a single device.

The disclosure is not limited to the above-described exemplary embodiment. Various modifications can be made based on the spirit of the disclosure. These modifications are included in the scope of the disclosure. As the customizable information definition 611, definition information about other scan functions (such as a function of transmitting data via e-mail, and a function of storing data into a network storage), a facsimile function, a print function, or a main unit setting function may be used. In addition, the user may be prompted to select the definition to be used by the description editor 604, from among a plurality of candidates.

In the above-described exemplary embodiment, the example in which the reproduction application resource 0206 manages a plurality of reproduction applications based on the versions has been described. However, the reproduction application resource 0206 may manage a plurality of reproduction applications using a different classification method instead of using the versions. For example, a reproduction application for a print function and a reproduction application for a scan function may be separately managed. In this case, the description editor 604 is to acquire a function-specific reproduction application corresponding to the function to be customized by the user, and to extract the customizable information definition 611 from the reproduction application. In this case, a definition for the print function is extracted from the reproduction application for the print function, and a definition for the scan function is extracted from the reproduction application for the scan function.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-114971, filed Jul. 12, 2021, which is hereby incorporated by reference herein in its entirety.

What is claimed is:

1. An information processing system comprising:
one or more processors; and
at least one memory storing instructions, which when executed by the one or more processors, cause the information processing system to:
acquire definition information from a reproduction application;
output screen information to a display based on the definition information;
receive an edit instruction corresponding to the screen information;
generate, based on the edit instruction, a description file corresponding to the reproduction application, the description file defining an operation procedure related to behavior of a custom application, the reproduction application being usable to reproduce the description file; and
generate package data in which the description file and the reproduction application are combined, the package data for installing the custom application to be executed by an image processing apparatus.

2. The information processing system according to claim 1, wherein the custom application is installed onto the image processing apparatus based on the package data including the reproduction application and the description file.

3. The information processing system according to claim 1, wherein the instructions are included in one or more programs to be executed on a web browser of an information processing terminal.

4. The information processing system according to claim 1, wherein the screen information includes information for performing an operation check of an application being edited.

5. The information processing system according to claim 1, wherein the screen information includes information about a component addable to an application being edited.

6. The information processing system according to claim 1, wherein the screen information includes information for editing a display component to be used by an application being edited.

7. The information processing system according to claim 1, wherein the instructions, when executed by the one or more processors, further cause the information processing system to reproduce the generated description file using the reproduction application.

8. The information processing system according to claim 1, wherein the reproduction application is a program based on a language different from a language used to access an authoring system or in a web browser.

9. The information processing system according to claim 8, wherein the different language is a Lua language.

10. The information processing system according to claim 1, wherein the description file is data described in a JavaScript Object Notation (JSON) format.

11. The information processing system according to claim 1, wherein the package data includes information about a version of the reproduction application.

12. The information processing system according to claim 1, wherein the instructions, when executed by the one or more processors, further cause the information processing system to change a drawing mode of information for performing an operation check of an application being edited.

13. The information processing system according to claim 1, wherein the definition information includes environment dependence information.

14. The information processing system according to claim 1, wherein the image processing apparatus includes an image forming circuit configured to form an image on a sheet.

15. The information processing system according to claim 1, wherein the image processing apparatus includes an image reading circuit configured to read an image from a document.

16. The information processing system according to claim 1, further comprising:
a server apparatus configured to communicate with the image processing apparatus; and
an information processing apparatus configured to communicate with the server apparatus.

17. An information processing apparatus comprising:
one or more processors; and
at least one memory storing instructions, which when executed by the one or more processors, cause the information processing apparatus:
acquire definition information from a reproduction application;
output screen information to a display based on the definition information;

receive an edit instruction corresponding to the screen information;

generate, based on the edit instruction, a description file corresponding to the reproduction application, the description file defining an operation procedure related to behavior of a custom application, the reproduction application being usable to reproduce the description file; and output the description file, wherein the description file and the reproduction application are combined in package data for installing the custom application to be executed by an image processing apparatus.

\* \* \* \* \*